United States Patent
Yuan

(10) Patent No.: US 11,091,261 B2
(45) Date of Patent: Aug. 17, 2021

(54) SYSTEMS AND METHODS FOR MULTI-ORIENTATION FLIGHT

(71) Applicant: SZ DJI TECHNOLOGY CO., LTD., Shenzhen (CN)

(72) Inventor: Bo Yuan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 299 days.

(21) Appl. No.: 16/245,946

(22) Filed: Jan. 11, 2019

(65) Prior Publication Data

US 2019/0144116 A1 May 16, 2019

Related U.S. Application Data

(63) Continuation of application No. PCT/CN2016/089818, filed on Jul. 12, 2016.

(51) Int. Cl.
*B64C 39/02* (2006.01)
*B64C 27/20* (2006.01)
(Continued)

(52) U.S. Cl.
CPC ............ *B64C 39/024* (2013.01); *B64C 27/08* (2013.01); *B64C 27/20* (2013.01); *G05D 1/101* (2013.01);
(Continued)

(58) Field of Classification Search
CPC ..... B64C 39/024; B64C 39/028; B64C 27/20; B64C 27/08; B64C 2201/027;
(Continued)

(56) References Cited

U.S. PATENT DOCUMENTS

2006/0226281 A1 10/2006 Walton
2014/0138477 A1* 5/2014 Keennon ............... B64C 39/024
244/17.23

FOREIGN PATENT DOCUMENTS

CN 103381885 A 11/2013
CN 105235891 A 1/2016
(Continued)

OTHER PUBLICATIONS

The World Intellectual Property Organization (WIPO) International Search Report and Written Opinion for PCT/CN2016/089818 dated Apr. 20, 2017 7 Pages.

*Primary Examiner* — Anne Marie Antonucci
(74) *Attorney, Agent, or Firm* — Anova Law Group, PLLC

(57) ABSTRACT

Systems and methods are provided for multi-orientation flight. An unmanned aerial vehicle (UAV) may be capable of flight in a first orientation and a second orientation that may be different from the first orientation. For example, a UAV may include one or more electronic speed control (ESC) units that may control direction of rotation of one or more propulsion units depending on the orientation of the UAV, to generate lift for the UAV. The one or more propulsion units may include protective covers that may protect one or more rotating components of the propulsion units when the UAV is on a landing surface in the first orientation or the second orientation. The UAV may change orientation on the landing surface or while in flight, in response to a sensed condition and/or instructions from a remote user.

20 Claims, 17 Drawing Sheets

(51) Int. Cl.
*B64C 27/08* (2006.01)
*G05D 1/10* (2006.01)

(52) U.S. Cl.
CPC .. *B64C 2201/024* (2013.01); *B64C 2201/027* (2013.01); *B64C 2201/042* (2013.01); *B64C 2201/108* (2013.01); *B64C 2201/12* (2013.01); *B64C 2201/123* (2013.01); *B64C 2201/126* (2013.01); *B64C 2201/128* (2013.01); *B64C 2201/141* (2013.01); *B64C 2201/146* (2013.01)

(58) Field of Classification Search
CPC ........ B64C 2201/123; B64C 2201/126; B64C 2201/146; B64C 2201/145; B64C 2201/128; B64C 2201/024; B64C 2201/108; B64C 2201/12; G08G 5/0069; G08G 1/101
See application file for complete search history.

(56) References Cited

FOREIGN PATENT DOCUMENTS

| | | |
|---|---|---|
| CN | 105573331 A | 5/2016 |
| CN | 205221127 U | 5/2016 |
| WO | 2013105926 A1 | 7/2013 |

* cited by examiner

SYSTEMS AND METHODS FOR MULTI-ORIENTATION FLIGHT

CROSS-REFERENCE TO RELATED APPLICATION

This application is a continuation of International Application No. PCT/CN2016/089818, filed on Jul. 12, 2016, the entire content of which is incorporated herein by reference.

BACKGROUND

Aerial vehicles such as unmanned aerial vehicles (UAVs) have a wide range of real-world applications including surveillance, reconnaissance, exploration, logistics transport, disaster relief, aerial photography, large-scale agriculture automation, live video broadcasting, etc. In some instances, an orientation of a UAV may be disrupted due to various factors such as severe weather conditions, collision with another object or the terrain, or malfunction of the UAV. This can cause the UAV to be in an upside position during flight or after a crash. In most cases, the UAV may not be capable of flight and/or taking off from an upside down position or an inclined position. A user may need to manually change the orientation of the UAV to a right-side up position to permit the UAV to take off. This may be inconvenient for users to re-launch the UAV, particularly when the UAV is far away from the user, or at some location that is unknown to the user or inaccessible to the user.

SUMMARY

A need exists for improved systems and methods for flight of aerial vehicles, such as unmanned aerial vehicles (UAVs). Multi-orientation flight may be provided for aerial vehicles, which may permit the UAV the takeoff, land, or fly the UAV in different orientations. For instance, the UAV may be capable of flight in both a first orientation and a second orientation. In some embodiments, the first orientation and the second orientation may be laterally opposite to each other. For example, in some cases, the UAV may be upside down when it is in the first orientation, and the UAV may be right side up when it is in the second orientation. The UAV may be capable of accommodating different orientations for flight, by altering the direction and/or speed of rotation of one or more propulsion units of the UAV to change the direction in which the lift force is being generated. One or more electronic speed control (ESC) units may aid in the changing of the direction and/or speed of rotation of the propulsion units. In some embodiments, the propulsion units may be protected by one or more protective covers. The protective covers can be used to protect one or more components of the propulsion units from impact with an external surface. The components of the propulsion units may include rotor blades and/or actuators (such as motors). The use of protective covers may permit the UAV to land on a landing surface without damage to the propulsion units. This may be particularly useful in crash landing situations where the orientation in which the UAV lands on a surface may be unknown. The systems and methods described herein may permit the UAV to take off from a landing surface, regardless of an orientation of the UAV on the surface. The landing surface can be a flat surface, inclined surface, or curved surface. In some instances, the landing surface may be a rough surface having undulating terrain.

In one aspect of the present disclosure, a method of operating an unmanned aerial vehicle (UAV) is provided. The method may comprise: providing a signal to control one or more corresponding propulsion units, thereby controlling directions of rotation of a first set of rotating components and a second set of rotating components of the one or more propulsion units, wherein the first set of rotating components are configured to rotate in a first direction and the second set of rotating components are configured to rotate in a second direction when the UAV is in a first orientation, and the first set of rotating components are configured to rotate in the second direction and the second set of rotating components are configured to rotate in the first direction when the UAV is in a second orientation opposite the first orientation; and protecting the one or more propulsion units with one or more protective covers that prevent the propulsion units from directly contacting an external object.

In some embodiments, the method may further comprise controlling the directions of the first and second sets of rotating components of the one or more propulsion units to generate a lift for the UAV. In some embodiments, the method may further comprise generating the lift when the UAV is taking off from an underlying surface when the UAV is in the first orientation or the second orientation. In some cases, a height of the one or more protective covers is greater than a height of a body of the UAV. In some cases, a height of the one or more protective covers is greater than a height of the one or more propulsion units. In some cases, a first portion of the one or more protective covers is in contact with an underlying surface when the UAV is in the first orientation, and a second portion of the one or more protective covers is in contact with the underlying surface when the UAV is in the second orientation. In some cases, the first and second portions of the one or more protective covers are laterally opposite to each other relative to a horizontal plane passing through a body of the UAV. In some cases, the second portion is located above the body in a direction of lift generated by the one or more propulsion units when the UAV is in the first orientation. In some cases, the first portion is located above the body in a direction of lift generated by the one or more propulsion units when the UAV is in the second orientation.

In some cases, each of the one or more protective covers forms a tunnel around a corresponding propulsion unit of the one or more propulsion units. In some cases, each protective cover comprises a sleeve in which a propulsion unit is disposed. In some cases, the one or more protective covers permit the one or more rotating components of the one or more propulsion units to rotate in the first direction or the second direction when the UAV is on an underlying surface. In some cases, the signal is provided to the one or more corresponding propulsion units by one or more electrical signal control (ESC) units, said ESC units configured to individually control speeds of one or more corresponding rotating components of the one or more propulsion units. In some cases, the signal from the one or more ESC units is configured to cause the UAV to change orientations between the first orientation and the second orientation. In some cases, the one or more rotating components include rotor blades.

In some cases, the first orientation is for the UAV to be upside down. In some cases, the second orientation is for the UAV to be right-side up. In some cases, the UAV is capable of taking off from an underlying surface in the first orientation and in the second orientation. In some cases, the UAV is capable of hovering or flight when in the first orientation and in the second orientation. In some cases, the one or more protective covers serve as landing gears for the UAV.

In another aspect of the present disclosure, an unmanned aerial vehicle (UAV) is disclosed herein. The UAV may comprise: one or more propulsion units configured to generate lift for the UAV, the one or more propulsion units comprising a first set of rotating components and a second set of rotating components, wherein the first set of rotating components are configured to rotate in a first direction and the second set of rotating components are configured to rotate in a second direction when the UAV is in a first orientation and the first set of rotating components are configured to rotate in the second direction and the second set of rotating components are configured to rotate in the first direction when the UAV is in a second orientation opposite the first orientation; one or more one or more processors, wherein one or more processors are configured to individually or collectively control direction of the first set of rotating components and the second set of rotating components of the one or more propulsion units; and one or more protective covers that prevent the one or more propulsion units from directly contacting an external object.

In some cases, the lift may be generated when the UAV is taking off from an underlying surface when the UAV is in the first orientation or the second orientation. In some cases, a height of the one or more protective covers is greater than a height of a body of the UAV. In some cases, a height of the one or more protective covers is greater than a height of the one or more propulsion units. In some cases, a first portion of the one or more protective covers is in contact with an underlying surface when the UAV is in the first orientation, and a second portion of the one or more protective covers is in contact with the underlying surface when the UAV is in the second orientation. In some cases, the first and second portions of the one or more protective covers are laterally opposite to each other relative to a horizontal plane passing through a body of the UAV. In some cases, the second portion is located above the body in a direction of lift generated by the one or more propulsion units when the UAV is in the first orientation. In some cases, the first portion is located above the body in a direction of lift generated by the one or more propulsion units when the UAV is in the second orientation.

In some cases, each of the one or more protective covers forms a tunnel around a corresponding propulsion unit of the one or more propulsion units. In some cases, each protective cover comprises a sleeve in which a propulsion unit is disposed. In some cases, the one or more protective covers permit the one or more rotating components of the one or more propulsion units to rotate in the first direction or the second direction when the UAV is on an underlying surface. In some cases, the one or more processors are located in one or more ESC units or a flight controller. In some cases, a signal from the one or more processors is configured to cause the UAV to change orientations between the first orientation and the second orientation. In some cases, the one or more rotating components include rotor blades.

In some cases, the first orientation is for the UAV to be upside down. In some cases, the second orientation is for the UAV to be right-side up. In some cases, the UAV is capable of taking off from an underlying surface in the first orientation and in the second orientation. In some cases, the UAV is capable of hovering or flight when in the first orientation and in the second orientation. In some cases, the one or more protective covers serve as landing gears for the UAV.

In another aspect of the present disclosure, a method of operating an unmanned aerial vehicle (UAV) is provided herein. The method may comprise: generating, with aid of one or more processors, a signal that causes the UAV to flip from a first orientation to a second orientation opposite the first orientation; and effecting, with aid of one or more propulsion units, the flip of the UAV from the first orientation to the second orientation in response to the signal.

In some cases, the UAV is flipped from the first orientation to the second orientation opposite the first orientation while the UAV is on an underlying surface. In some cases, the methods further comprising obtaining data indicative of a user input to initiate the flip of the UAV from the first orientation to the second orientation. In some cases, the user input is received at a terminal remote to the UAV. In some cases, the terminal transmits the user input to the UAV via a wireless connection. In some cases, the methods further comprising obtaining data from one or more sensors to initiate the flip of the UAV from the first orientation to the second orientation. In some cases, the one or more sensors are on-board the UAV. In some cases, the one or more sensors detect an orientation of the UAV. In some cases, the first orientation of the UAV is to be upside down. In some cases, the second orientation of the UAV is to be right side up.

In some cases, the UAV comprises one or more protectors that prevent the one or more propulsion units from directly contacting the underlying surface. In some cases, the UAV is on the underlying surface for at least a moment in time after flipping to the second orientation. In some cases, the methods further comprising effecting, with aid of the one or more propulsion units, takeoff of the UAV from the underlying surface subsequent to the flip of the of the UAV from the first orientation to the second orientation. In some cases, the methods further comprising effecting flight of the UAV in the second orientation. In some cases, the UAV is flipped from the first orientation to the second orientation opposite the first orientation when one or more sensors detect that the UAV has reached a threshold condition. In some cases, the one or more sensors are onboard the UAV. In some cases, the one more sensors are configured to detect whether the UAV has reached the threshold condition when the UAV is in flight. In some cases, the threshold condition is reached during flight of the UAV. In some cases, the threshold condition is an altitude of the UAV with respect to the underlying surface. In some cases, the threshold condition is a velocity or acceleration of the UAV with respect to the underlying surface. In some cases, the velocity or acceleration is a vertical velocity or acceleration of the UAV with respect to the underlying surface. In some cases, the threshold condition is power provided to the one or more propulsion units, or power consumed by the one or more propulsion units. In some cases, the threshold condition is an amount of time that has elapsed since the UAV has taken off from the underlying surface. In some cases, the one or more sensors are on-board the UAV. In some cases, the one or more propulsion units permit the UAV to take off from the underlying surface regardless of orientation of the underlying surface relative to the direction of gravity. In some cases, the first orientation is for the UAV to be upside down. In some cases, the second orientation is for the UAV to be right side up.

In some cases, the UAV comprises one or more protectors that prevent the one or more propulsion units from directly contacting the underlying surface. In some cases, the signal is indicative of a user input to initiate the flip of the UAV. In some cases, the user input is provided via a user terminal remote to the UAV. In some cases, the signal is generated at the user terminal and transmitted via one or more communication channels from the user terminal to the UAV. In some cases, the user input to initiate the flip is only capable of initiating the flip and no other actions by the UAV. In some cases, the flip of the UAV from the first orientation to the second orientation causes a change in at least 170 degrees of the orientation of the UAV. In some cases, the user input is a single action that effects the flip of the UAV from the first orientation to the second orientation. In some cases, the single action is the selection of a button or touchscreen of a terminal remote to the UAV. In some cases, the single action is the flip of a switch on a terminal remote to the UAV. In some cases, the single action is a verbal command that is registered by a terminal remote to the UAV. In some cases, the single action is a change in attitude of a terminal remote to the UAV. In some cases, the signal indicative of the user input is obtained while the UAV is on an underlying surface. In some cases, the signal indicative of the user input is obtained while the UAV is in flight. In some cases, the first orientation is for the UAV to be upside down. In some cases, the second orientation is for the UAV to be right side up. In some cases, the UAV comprises one or more protectors that prevent the one or more propulsion units from directly contacting the underlying surface.

In yet another aspect of the present disclosure, an unmanned aerial vehicle (UAV) is disclosed herein. The UAV may comprise: one or more processors, individually or collectively configured to generate a signal that causes the UAV to flip from a first orientation to a second orientation opposite the first orientation; and one or more propulsion units that effect the flip of the UAV from the first orientation to the second orientation in response to the signal.

In some cases, the flip of the UAV from the first orientation to the second orientation opposite the first orientation is while the UAV is on an underlying surface. In some cases, the one or more processors is configured to obtain data indicative of a user input to initiate the flip of the UAV from the first orientation to the second orientation. In some cases, the user input is received at a terminal remote to the UAV. In some cases, the terminal transmits the user input to the UAV via a wireless connection. In some cases, the one or more processors are configured to obtain data from one or more sensors to initiate the flip of the UAV from the first orientation to the second orientation. In some cases, the one or more sensors are on-board the UAV. In some cases, the one or more sensors detect an orientation of the UAV. In some cases, the first orientation of the UAV is to be upside down. In some cases, the second orientation of the UAV is to be right side up.

In some cases, the UAV comprises one or more protectors that prevent the one or more propulsion units from directly contacting the underlying surface. In some cases, the UAV is on the underlying surface for at least a moment in time after flipping to the second orientation. In some cases, the one or more propulsion units is configured to effect, with aid of the one or more propulsion units, takeoff of the UAV from the underlying surface subsequent to the flip of the of the UAV from the first orientation to the second orientation. In some cases, the one or more propulsion units are configured to effect effecting flight of the UAV in the second orientation. In some cases, the flip of the UAV from the first orientation to the second orientation opposite the first orientation is when one or more sensors detect that the UAV has reached a threshold condition. In some cases, the one or more sensors are onboard the UAV. In some cases, the one more sensors are configured to detect whether the UAV has reached the threshold condition when the UAV is in flight. In some cases, the threshold condition is reached during flight of the UAV. In some cases, the threshold condition is an altitude of the UAV with respect to the underlying surface. In some cases, the threshold condition is a velocity or acceleration of the UAV with respect to the underlying surface. In some cases, the velocity or acceleration is a vertical velocity or acceleration of the UAV with respect to the underlying surface. In some cases, the threshold condition is power provided to the one or more propulsion units, or power consumed by the one or more propulsion units. In some cases, the threshold condition is an amount of time that has elapsed since the UAV has taken off from the underlying surface. In some cases, the one or more sensors are on-board the UAV. In some cases, the one or more propulsion units permit the UAV to take off from the underlying surface regardless of orientation of the underlying surface relative to the direction of gravity. In some cases, the first orientation is for the UAV to be upside down. In some cases, the second orientation is for the UAV to be right side up.

In some cases, the UAV comprises one or more protectors that prevent the one or more propulsion units from directly contacting the underlying surface. In some cases, the signal is indicative of a user input to initiate the flip of the UAV. In some cases, the user input is provided via a user terminal remote to the UAV. In some cases, the signal is generated at the user terminal and transmitted via one or more communication channels from the user terminal to the UAV. In some cases, the user input to initiate the flip is only capable of initiating the flip and no other actions by the UAV. In some cases, the flip of the UAV from the first orientation to the second orientation causes a change in at least 170 degrees of the orientation of the UAV. In some cases, the user input is a single action that effects the flip of the UAV from the first orientation to the second orientation. In some cases, the single action is the selection of a button or touchscreen of a terminal remote to the UAV. In some cases, the single action is the flip of a switch on a terminal remote to the UAV. In some cases, the single action is a verbal command that is registered by a terminal remote to the UAV. In some cases, the single action is a change in attitude of a terminal remote to the UAV. In some cases, the signal indicative of the user input is obtained while the UAV is on an underlying surface. In some cases, the signal indicative of the user input is obtained while the UAV is in flight. In some cases, the first orientation is for the UAV to be upside down. In some cases, the second orientation is for the UAV to be right side up. In some cases, the UAV comprises one or more protectors that prevent the one or more propulsion units from directly contacting the underlying surface.

It shall be understood that different aspects of the present disclosure may be appreciated individually, collectively, or in combination with each other. Various aspects of the present disclosure described herein may be applied to any of the particular applications set forth below or for any other types of UAVs. Any description herein of an aerial vehicle may apply to and be used for any UAV, such as any vehicle. Additionally, the devices and methods disclosed herein in the context of aerial motion (for example, flight) may also be applied in the context of other types of motion, such as movement on the ground or on water, underwater motion, or motion in space. Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference in its entirety.

BRIEF DESCRIPTION

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings of which:

Figure 16:
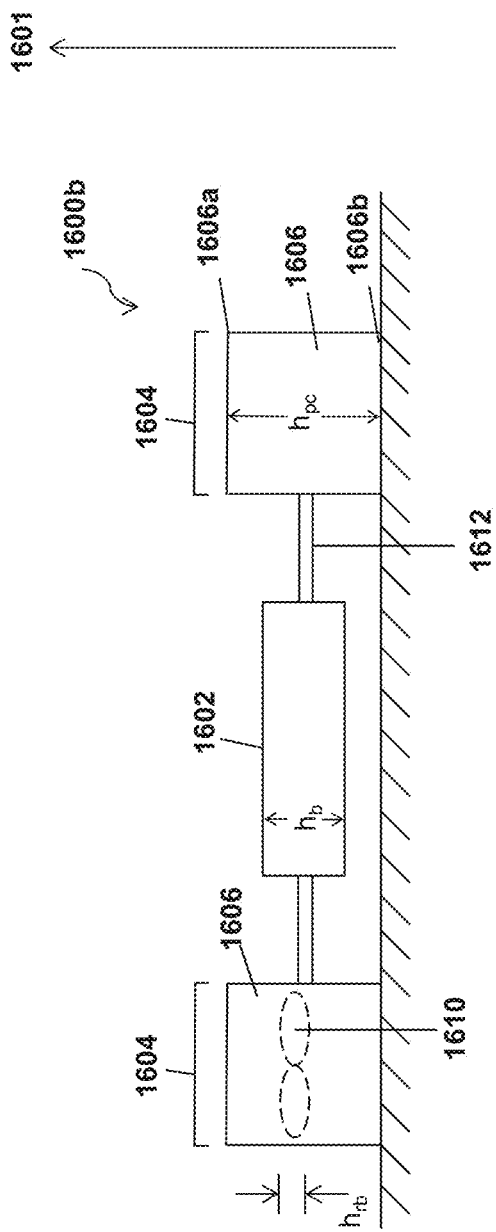

FIG. 16 provides an illustration of various components of a UAV, in accordance with embodiments of the present disclosure.

Figure 17:
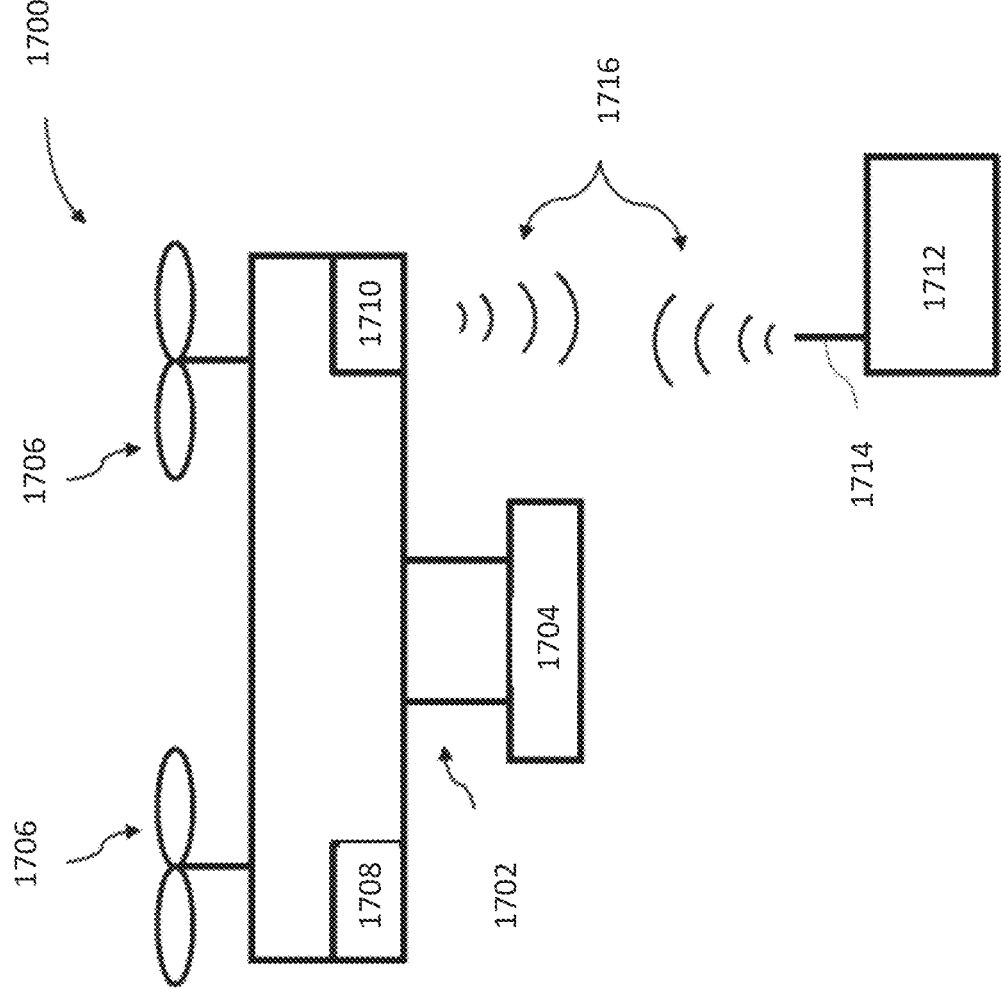

FIG. 17 is a schematic block diagram of a system for controlling a movable object, in accordance with some embodiments.

DETAILED DESCRIPTION

Systems and methods are provided herein for enabling multi-orientation flight, take-off, and landing of an aerial vehicle. An aerial vehicle, such as an unmanned aerial vehicle (UAV), may support one or more propulsion units that are configured to generate lift for the aerial vehicle. Any description herein of a UAV may apply to any type of aerial vehicle or UAV, or vice versa. The UAV may be capable of flight in a first orientation and a second orientation different from the first orientation. The second orientation can be an orientation that is opposite to the first orientation. For example, the UAV may be in a right-side up position when it is in the first orientation, and the UAV may be in an upside-down position when it is the second orientation. The UAV may be configured to take off, land, and/or fly around in the first orientation and the second orientation. This may be particularly useful in situations where the UAV may land or crash on a surface in an uncontrolled manner. In some cases, the UAV may land on a surface in an upside down orientation, right-side up orientation, or tilted orientation. The UAV disclosed herein may be capable of re-launch into flight from the surface, regardless of an orientation in which the UAV is landed on the surface.

The UAV may be capable of changing its orientation in different scenarios. For instance, the UAV may change orientation while the UAV is on a landing surface. In some cases, the UAV may take off for flight after changing its orientation. In another example, the UAV may take off from a landing surface, and then change orientation in mid-air (during flight) in response to a detected threshold condition. In some instances, the UAV may change orientation in response to a user command. This may occur when the UAV is on a landing surface, or in flight. This may allow the UAV to change orientations to accommodate various situations. Any combination of automated, semi-automated, or manual flight commands may be used to control the UAV to change orientations. This may advantageously permit novice users, as well as advanced users, to control the UAV to change flight orientations for various scenarios.

The change in UAV orientation may occur by controlling operation of one or more propulsion units of the UAV. The propulsion units of the UAV may include rotatable components (e.g., rotor blades), that may be capable of rotating in different directions and at different speeds. For instance, a propulsion unit may rotate in a first direction to generate lift for the UAV when the UAV is in a first orientation, and may rotate in a second direction opposite the first direction to generate lift for the UAV when the UAV is in a second orientation. One or more electronic speed control (ESC) units may be in communication with one or more propulsion units to control operation of the propulsion units. For instance, an ESC control unit may control the direction and/or speed of rotation of one or more rotor blades of a propulsion unit. Any description of a rotor blade elsewhere herein may also apply to a rotor, and vice versa.

Protective covers may be provided for the propulsion units of the UAV. The protective covers may protect rotatable components of the propulsion units from external impact. For example, the protective covers may prevent rotatable components of the propulsion units from contacting an underlying surface when the UAV is landed on the underlying surface. The protective covers may be configured to surround the rotatable components of the propulsion units, and serve as an enclosure for the rotatable components. Through use of the protective covers, the rotors of the UAV can rotate freely even though the UAV may be landed upside down or on its side. This may be particularly advantageous for permitting a crash-landed UAV to take off from various orientations, since the UAV may unpredictably land in various orientations or in different types of environments.

Figure 1:
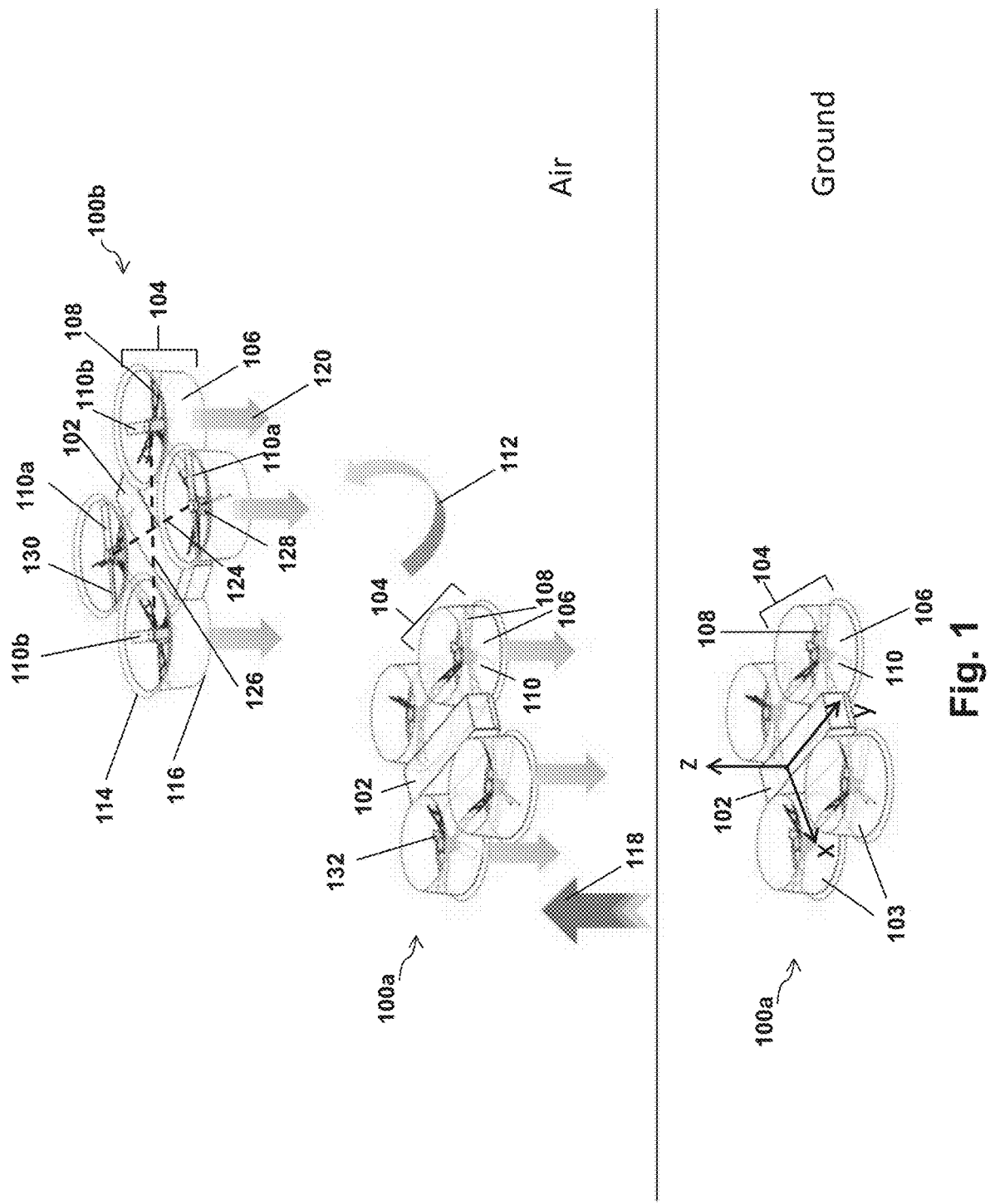
FIG. 1 shows an example of an unmanned aerial vehicle (UAV) capable of flight in multiple orientations, in accordance with embodiments of the present disclosure.

FIG. 1 shows an exemplary embodiment of an unmanned aerial vehicle (UAV) capable of flight in multiple orientations, in accordance with embodiments of the present disclosure. The UAV may include a body 102 configured to support one or more propulsion units 103. The propulsion units may function to generate downward propulsion 120 thereby generating a lift 118 or a thrust to the UAV.

Each propulsion unit 103 may include a set of rotating components. Each set of rotating components may include one or more rotor blades 110a, 110b capable of rotating in two directions. The two directions may be opposite to each other. For example, the first direction may be a clockwise direction, and the second direction may be a counter clockwise direction. The one or more rotor blades 110a, 110b of the same rotating component or propulsion unit may be actuated by one or more actuators or motors. One or more rotor blades 110a, 110b of the same propulsion unit may be connected to a hub 128, and configured to rotate about the hub. Each propulsion unit may also include a support structure 108 for one or more of: rotor blade(s) 110a, 110b, the actuator(s), and optionally the hub. For instances, a propulsion unit may include two rotor blades actuated by the same motor.

The rotor blades may be configured to rotate in different directions to generate lift for the UAV, or to change an orientation of the UAV. For example, the UAV may be configured to fly in a first orientation 100a when a first set of rotor blades are rotating in a first direction and a second set of rotor blades are rotating in a second direction opposite to the first direction. Conversely, the UAV may be configured to fly in a second orientation 100b when the first set of rotor blades are rotating in the second direction and the second set of rotor blades are rotating in the first direction. The UAV may be capable of taking off and flying in either the first orientation 100a or the second orientation 100b. After the UAV has taken off from a surface, the UAV may be capable of changing its orientation in mid-air (e.g., during flight) from the first orientation 100a to the second orientation 100b. The change in orientation may be triggered by a pre-determined condition. In some cases, the change in orientation can be performed autonomously or semi-autonomously without user intervention.

In various embodiments, disclosed herein are UAVs including one or more propulsion units (e.g., 4 propulsion units in FIG. 1) configured to generate lift for the UAV. In some cases, the UAV may include 2, 4, 6, 8, 10, 12, 14, or any other number of propulsion units. The one or more propulsion units may include a first set of rotating components 110a (along a first diagonal 124 of the UAV) and a second set of rotating components 110b (along a second diagonal 126 of the UAV). The first set of rotating components (e.g. 1 or 3 in FIG. 15) may be configured to rotate in a first direction and the second set of rotating components (e.g. 2 or 4 in FIG. 15) are configured to rotate in a second direction when the UAV is in a first orientation (100a) and the first set of rotating components are configured to rotate in the second direction and the second set of rotating components are configured to rotate in the first direction when the UAV is in a second orientation (100b) opposite the first orientation. The first and second diagonals are within the x-y plane and are not parallel to the pitch axis (x axis) and roll axis (y axis). The first or the second diagonal may be about 10 degrees to about 80 degrees tilted from the pitch axis or the roll axis. In some instances, the first and second directions may include a clockwise direction and a counter clockwise direction. For example, the UAV may be upside down when it is in the first orientation, and right-side up when it is in the second orientation.

In some cases, each propulsion unit is directly attached to the outer surface of the central body 102. Alternatively, each propulsion unit may be attached to the central body through an arm extending from the outer surface of the central body. One end of the arm may attach to the outer surface of the central body via one or more joints. Another end of the arm may be configured to support the propulsion unit. The joints may fix the arm to the central body, thus allowing the arm to move with the central body as an integral piece.

A protective cover 106 may be provided to protect each propulsion unit from impact or damage. The protective cover 106 can prevent the propulsion unit and the components therein from contacting external objects or a surface. Each protective cover may have a top edge 114 and a bottom edge 112. The UAV may be either in a first orientation 100a or a second orientation 100b. The UAV may be configured to fly or hover in either orientation (100a or 100b). The top edge may face upward in the second flight orientation while the bottom edge may face downward in the second orientation. The first and second orientation may be opposite from each other. The protective cover may be a separate component from the propulsion unit. In other embodiments, the protective cover may be part of the propulsion unit. The protective cover may be releasably coupled to the body of the UAV. Alternatively, the protective may be integrally formed with the body of the UAV. For some instances, the protective cover may be directly attached to the body of the UAV.

The UAV may include one or more protective covers 106 that prevent the one or more propulsion units from directly contacting an external object. In some cases, a height $h_{pc}$ of the one or more protective covers 106 is greater than a height $h_b$ of a body 102 of the UAV (FIG. 17). In some cases, a height $h_{pc}$ of the one or more protective covers is greater than a height of the one or more propulsion units (e.g., height $h_{rb}$ of rotors 110a, 110b, motors, and supporting structures 108) (FIG. 17). In some cases, each of the one or more protective covers 106 forms a tunnel around a corresponding propulsion unit of the one or more propulsion units. The tunnel structure may surround the propulsion unit on its side, while exposing its top and bottom. This structure may allow and/or facilitate the lift force 118 to be generated through and from the top and bottom of the tunnel structure. In some cases, each protective cover comprises a sleeve in which a propulsion unit is disposed. The tunnel or sleeve of the protective cover may have a diameter (e.g. 704 in FIG. 7) that is sufficient to allow a set of rotating components to be enclosed therein and rotates in both directions. In some cases, the one or more protective covers permit the one or more rotating components of the one or more propulsion units to rotate in the first direction or the second direction when the UAV is on an underlying surface. The rotating component may include a rotor (or rotor blades), a set of rotor(s), and/or a motor actuating the rotor(s).

The UAV may include one or more one or more processors configured to individually or collectively control direction and speed of the first set of rotating components and the second set of rotating components of the one or more propulsion units. In some cases, the one or more processors are located in one or more ESC units and/or a flight controller. In alternative embodiments, the one or more processors are located in the central body or remotely off the UAV. In some cases, the processors may be configured to generate a signal to control one or more propulsion units. In some cases, a signal from the one or more processors is configured to cause the UAV to change orientations between the first orientation and the second orientation.

The UAV may include one or more sensors. Any sensor for collecting environmental information can be used, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any combination of active sensors (e.g., sensors that generate and measure energy from their own source) and passive sensors (e.g., sensors that detect available energy).

The sensor data may provide various types of environmental information. For example, the sensor data may be indicative of an environment type, such as an indoor environment, outdoor environment, low altitude environment, high altitude environment, etc. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as structures or obstacles.

In some embodiments, the one or more sensors can comprise one or more of: a GPS sensor, an inertial sensor, a vision sensor, a lidar sensor, an ultrasonic sensor, a barometer, or an altimeter. The one or more sensors can comprise a plurality of different sensor types. The one or more sensors can comprise a GPS sensor and the environment type can be determined based on a number of GPS satellites in communication with the GPS sensor. The one or more sensors can comprise a lidar sensor and the environment type can be determined based on time-of-flight data obtained by the lidar sensor. The one or more sensors can comprise a vision sensor and the environment type can be determined based on image data obtained by the vision sensor, such as an exposure time associated with the image data obtained by the vision sensor.

In some embodiments, at least some of the sensors may be configured to provide data regarding a state of the UAV. The state information provided by a sensor can include information regarding a spatial disposition of the UAV (e.g., position information such as longitude, latitude, and/or altitude; orientation information such as roll, pitch, and/or yaw). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global reference frame or relative to the reference frame of another entity. For example, a sensor can be configured to determine the distance between the UAV and the user and/or the starting point of flight for the UAV.

The sensing data provided by the one or more sensors can be used to control the spatial disposition, velocity, rotating direction of each set of blades, rotating direction of one or more propulsion units, rotation speed of each set of rotor blades, and/or orientation of the UAV (e.g., using a digital signal processing device, a processor, and/or control module). Alternatively, a sensor can be used to provide data regarding the environment surrounding the UAV, such as weather conditions, proximity to potential obstacles, location of geographical features, location of manmade structures, a wind speed, a wind direction, a rain speed, a temperature, and the like. Such environmental data may be with respect to up to three degrees of translation and up to three degrees of rotation.

The UAV may include at least one communication device. The communication device may enable communication with remote terminal(s) via wireless signal. The communication device may include any number of digital processors, software modules, transmitters, receivers, and/or transceivers for wireless communication. The communication may be one-way communication, such that data can be transmitted in only one direction to or from the UAV. For example, one-way communication may involve only the UAV transmitting data to the terminal, or vice-versa. The data may be transmitted from one or more transmitters of the communication devices to one or more receivers of the communication system, or vice-versa. Alternatively, the communication may be two-way such that data can be transmitted in both directions between the UAV and the terminal. The two-way communication can involve transmitting data from one or more transmitters of the communication system to one or more receivers of the terminal, and vice-versa. The communication device may be located at any part of the UAV; for example, in the body 102, the protective cover 106, the rotors 110a, 110b, and/or the supporting structure 108.

In some embodiments, the UAV may include a remote terminal. The terminal can be a remote control device at a location distant from the UAV. The terminal can be disposed on or affixed to a support platform. Alternatively, the terminal can be a handheld or wearable device. In some cases, the terminal may include a smartphone, tablet, laptop, computer, glasses, gloves, helmet, microphone, or combinations thereof. The terminal can include a user interface, such as a keyboard, mouse, joystick, touchscreen, or display. Any user input can be used to interact with the terminal, such as manually entered commands, voice control, gesture control, or position control (e.g., via a movement, location or tilt of the terminal).

The terminal can be used to control any state of the UAV, carrier, and/or payload. For example, the terminal can be used to control the position and/or orientation of the UAV, carrier, and/or payload relative to a fixed reference from and/or to each other. In some embodiments, the terminal can be used to control individual elements of the UAV, carrier, and/or payload, such as one or more actuators, one or more propulsion units, a sensor, a landing gear. The terminal can include a wireless communication device adapted to communicate with one or more of the UAV, carrier, or payload, or individual elements within the UAV.

The terminal can include a display unit for viewing information of the UAV, carrier, and/or payload. For example, the terminal can be configured to display information of the UAV, carrier, and/or payload with respect to position, translational velocity, translational acceleration, orientation, angular velocity, angular acceleration, angular momentum, battery remaining, rotor blades speed, rotating frequency of rotor blade(s), rotating direction of rotor blade(s), orientation of UAV, or any combinations thereof. In some embodiments, the terminal can display information provided by the payload, such as data provided by a functional payload (for example, images recorded by a camera or other image capturing device).

Optionally, the same terminal may control the UAV, carrier, and/or payload, or a state of UAV, carrier and/or payload, as well as receive and/or display information from the UAV, carrier and/or payload. For example, a terminal may control the orientation of the UAV relative to an environment, while displaying data captured by one or more sensors, or information about the position of the UAV. Alternatively, different terminals may be used for different functions. For example, a first terminal may control movement or a state of the UAV, carrier, and/or payload while a second terminal may receive and/or display information from the UAV, carrier, and/or payload. For example, a first terminal may be used to control the orientation of the UAV relative to an environment while a second terminal displays data captured by one or more sensors. Various communication modes may be utilized between an UAV and an integrated terminal that both controls the UAV and receives data, or between the UAV and multiple terminals that both control the UAV and receives data. For example, at least two different communication modes may be formed between the UAV and the terminal that both controls the UAV and receives data from the UAV.

The UAV may have at least a first flight orientation 100a, and a second flight orientation 100b. The first flight orientation and the second flight orientation may be opposite to each other. In some cases, the first orientation is for the UAV to be upside down. In some cases, the second orientation is for the UAV to be right-side up. In some cases, the UAV is capable of taking off from an underlying surface in the first orientation and in the second orientation. In some cases, the UAV is capable of hovering or flight when in the first orientation and in the second orientation. The first flight orientation and the second flight orientation may be about 10, 20, 30, 40, 50, 60, 70, 80, 90, 100, 110, 120, 130, 140, 150, 160, 170, 180, 190, 200, 210, 220, 230, 240, 250, 260, 260, 270, 280, 290, 300, 310, 320, 330, 340, or 350 degrees in difference. For example, in the right-side up flight orientation, a first portion 114 (for example, a top edge) of the protective cover may be substantially facing upward and may be farther to the ground than a second portion 116 (for example, a bottom edge) of the protective cover. Conversely, in the upside down flight orientation, the first portion (for example, the top edge) of the protective cover may be substantially facing downward and may be closer to the ground than the second portion (for example, bottom edge) of the protective cover.

As another example, in the right side up flight orientation, top surface(s) 130 of the rotor blades 110a, 110b may be substantially facing upward and may be farther to the ground than the bottom surface(s) 132 of the rotor blades. Conversely, in the upside down flight orientation, the top surfaces(s) of the rotor blades may be substantially facing downward and may be closer to the ground than the bottom surface(s) of the rotor blades. In some embodiments, one of the first and the second orientations may be a common or more frequently used flight orientation of the UAV, while the other one of the first and the second orientations may be a less common or less frequently used flight orientation of the UAV. For example, the second orientation (in which the UAV is right-side up) may be more commonly used, while the first orientation (in which the UAV is upside down) may be less commonly used. In some cases, when the UAV first takes off, the first portion of the protective cover of the UAV may face upward and the second portion of the protective cover may face downward. In other cases, when the UAV first takes off, the first portion of the protective cover of the UAV may face downward and the second portion of the protective cover may face upward.

In some embodiments, the first flight orientation 100a and the second flight orientation 100b may be not substantially parallel to each other. When the first orientation and the second orientation are substantially opposite to each other with about 180 degrees in difference, they may not be substantially parallel to each other. The first flight orientation and the second flight orientation may have any angle of difference in the range from 1 degree to about 359 degrees. The first flight orientation and the second flight orientation may be at least about 30, 45, 60, 90, 120, 135, 150, 180, 210 degrees and so forth different from each other (e.g. FIGS. 6-10). As an example, in the first flight orientation, the UAV may be parallel to a horizontal (x-y plane in FIG. 1) plane and may have the top surface(s) of the rotor blades facing upwards and the bottom surfaces facing downwards. In the second flight orientation, the UAV may be 30 degrees tilted from the horizontal plane, with the right-side of the UAV higher than the left-side of the UAV relative to a horizontal plane, and the front-side and rear-side of the UAV are at the same height (e.g., FIG. 6). Alternatively, in a right side up orientation, each of the propulsion units of the UAV can have a different height to an external object (e.g. a ground, a water surface) as shown in FIG. 18. In this embodiment, the pitch, roll, and/or yaw axis of the UAV may be oblique to the horizontal plane or the lift direction.

The UAV may have any number of possible flight orientations. Each two flight orientations among the possible orientations may not be substantially identical to each other. Each two flight orientations among the possible orientations may not be substantially parallel to each other. When the first orientation 100a and the second orientation 100b are substantially opposite to each other with about 180 degrees in difference, the UAV in two different flight orientations may look similar after the UAV has changed its orientation. The UAV can change its orientation, for example by rotating about its plane of symmetry from one orientation to another orientation. The UAV may have a symmetrical axis extending from its front-side to its rear-side along the roll axis (y axis in FIG. 1). In other words, the UAV may be symmetric from left to right along the pitch axis (x axis in FIG. 1). Alternatively, two different flight orientations may look similar to each other when the UAV has a symmetrical axis extending from its left-side to its right-side along the pitch axis (x axis in FIG. 1). In other words, the UAV may be symmetric from front to rear along the roll axis (y axis in FIG. 1). Two different flight orientations may look similar to each other when the UAV has a symmetrical axis running from its top to its bottom along the yaw axis (z axis in FIG. 1). As an example, the UAV with the right-side up may look similar as the UAV with its upside down.

The protective covers may be in a shape that is symmetric from its top edges to bottom edges along the yaw axis (z axis in FIG. 1). When viewed from above the UAV, the rotor blades may rotate in the same clockwise or counter clockwise direction when the UAV is upside down. Alternatively, the rotator blades may rotate in an opposite rotating direction when the UAV is upside down. The central body may be symmetric about a horizontal plane (x-y plane in FIG. 1). A first distance of the rotor blades to the top edge of the protective cover may be substantially the same as a second distance of the rotor blades to the bottom edge of the protective cover. Alternatively, the first distance and the second distance may be substantially different. In some cases, the first distance may be greater than the second distance. Alternatively, the first distance may be less than the second distance. In some cases, the UAV has at least one, two, or three planes of symmetry. The plane(s) may be orthogonal to each other when there are two or more planes of symmetry. The plane(s) may be oblique to each other. As an example, a plane of symmetry of the UAV may be parallel to the horizontal plane (x-y plane in FIG. 1), or the top and bottom surfaces of the central body, and located at middle point of the height of the central body. As another example, a plane of symmetry of the UAV may be parallel to the right or left surfaces of the central body and located at the mid-point of the width of the central body. In other words, a plane of symmetry of the UAV may be parallel to y-z plane or x-z plane in FIG. 1. As another example, a plane of symmetry of the UAV may be orthogonal to the right or left surfaces of the central body and located at the mid-point of the length of the central body. In some cases, the plane of symmetry may virtually separate the UAV into two parts with identical numbers of same type of elements (for example, propulsion units, rotor blades, arms, motors). In some cases, the plane of symmetry may virtually separate the UAV and one or more elements therewithin in halves. As an example, a plane of symmetry from the right-front tip of the UAV to the left-rear tip of the UAV may separate two propulsion units into four halves.

In some embodiments, a UAV (or one or more of its components) may be asymmetric in shape, weight, or density around a rotational axis of the UAV. In those embodiments, the UAV in two different flight orientations may look different when the UAV changes from a first orientation to a second orientation. As an example, the UAV may look different when it is upside down compared to when the UAV is right side up. The protective covers may have a shape that is asymmetric from its top edges to bottom edges (about a horizontal plane). The rotator blades may or may not rotate in the same clockwise or counter clockwise direction when the UAV is upside down. The central body may be asymmetric from its top surfaces to bottom surfaces (about a horizontal plane). The rotor blades may have different distances to the top and the bottom edges of the protective covers. The UAV may include a structural shape that only exists at the bottom surface or top surface of the protective cover. The UAV may include a landing gear that only exists at the bottom side of the UAV. The UAV may use different materials at its bottom and its top side. The UAV may have a central body shape that is a symmetric about a plane of rotation, the plane of rotation may be any three dimensional plane.

The UAV may sense its orientation, or a change of orientation using one or more sensing units. The sensing unit may be a sensor as disclosed herein. The sensing unit may be any number of sensors. The sensing unit may be located on the UAV or off-board of the UAV. The sensing unit may be located at any part of the UAV, for example, in the body 102, the protective cover 106, the rotors 110a, 110b, and/or the supporting structure 108. In some cases, the sensing unit is a combination of any number of sensors on the UAV and any number sensors off from the UAV.

Any sensor for collecting environmental information can be used, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any combination of active sensors (e.g., sensors that generate and measure energy from their own source) and passive sensors (e.g., sensors that detect available energy).

The sensors may directly sense data selected from: position, position change at two time points, translational velocity, translational velocity change at two time points, translational acceleration, change in translational acceleration at two time points, orientation, angular velocity, change in angular velocity at two time points, angular momentum, change in angular momentum at two time points, angular acceleration, change in angular acceleration at two time points, rotor blades speed, rotor blades frequency, rotating direction of rotor blade(s) or any combinations thereof with respect to up to three degrees of translation and up to three degrees of rotation. The sensors may sense data that may be used to derive or generate information regarding the above-listed data. Data sensed by and collected from the sensors are optionally processed so that they may be analyzed at a certain confidence level. The processed or unprocessed raw data from one or more sensors may be analyzed to yield orientation of the UAV.

The UAVs and methods of operating an UAV as disclosed herein may include generating a signal that causes the UAV to flip from a first orientation to a second orientation opposite the first orientation via one or more processors from the flight controller or the electrical signal control unit (ESC). Further, the UAVs and methods of operating the UAV as disclosed herein may include effecting the flip of the UAV from the first orientation to the second orientation in response to the signal with aid of one or more propulsion units. The UAV may change orientation (e.g., flip) via control of rotational speed and/or direction of one or more propulsion units. The UAV may change orientation via control of rotational speed and/or direction of one or more rotor blades. As an example, an UAV with four propulsion units may include two pairs of identical fixed pitched rotors; two rotating clockwise on a diagonal and two rotating counter-clockwise on the other diagonal of the UAV in one flight orientation. To change to another orientation, the rotational speed or orientation of one pair of rotors may change with or without the change of speed or orientation of the other pair of rotors. As another example, when an obstacle is detected to the left side of the UAV, the UAV may increase the rotational speed of two propulsion units on the left-side of the UAV so that the left side may be lifted further up along a vertical direction than the right side to avoid the obstacle. As another example, when the UAV hits an obstacle and flipped accidentally, the UAV may automatically revert the rotation direction of all propulsion units to resume flying with the flipped orientation and later increase the rotational speed of one or more propulsion units (e.g. two propulsion units on the right-side of the UAV) optionally with decrease of other propulsion units (e.g. two propulsion units on the left-side of the UAV) so that the right side of the UAV may be lifted up and the left side may be lowered to produce a 90 degree rotation and eventually 180-degree flip of the entire UAV about the roll axis of the UAV. The rotational speed and direction of each propulsion unit may be individually adjusted during the flip and/or after the UAV is flipped.

With control of each propulsion unit separately or together, the flipping type, and the flipping velocity of the UAV may be controlled. The flipping velocity may have a constant magnitude with a varying direction. The flipping velocity may be varying in both its magnitude and direction. The magnitude of flipping velocity may include any shape of waveform that starts from zero at the onset of flipping and ends at zero at the end of flipping.

The UAV may rotate and flip about the roll axis (y axis in FIG. 1). The UAV may flip about the pitch axis (x axis in FIG. 1). The UAV may rotate about the yaw axis (z axis in FIG. 1). The flip angle may be any angle greater than about 1 degree to the initial orientation before the flip. The flip angle may be 15, 30, 45, 60, 75, 90, 105, 120, 135, 1550, 165, 180, 195, 210, 225, 240, 255, 270, 285, 300, 315, 330, 345, 360 degrees or any other angles greater than 1 degree and less than 360 degrees. Alternatively, the flip angle may be greater than 360 degrees when the UAV may flip more than one revolution from the first orientation to the second orientation. As an example, the UAV flips from left to right for 180 degrees from its initial orientation in a horizontal plane, so that the UAV is upside down and its left-side is flipped to the right. As another example, the UAV flips from rear to front for 90 degrees from its initial orientation in a horizontal plane, so that the UAV is rear-side up and its front side is flipped to the bottom.

In a flip or a change of orientation of the UAV, the UAV may have horizontal movement (in an x-y plane in FIG. 1), vertical movement (along z axis in FIG. 1), rotational movement (about a flipping axis e.g., FIGS. 13-15), or a combination thereof. A flip or change of orientation may occur when the UAV hovers, moves, maintains a same position, lands, touches an external object, fails to move in a certain direction, detects error in at least one UAV elements, or malfunctions in an orientation.

The flip or change of orientation of the UAV may occur with or without the assistance from one or more sensors. The UAV may change its orientation when a signal is given from its control unit or terminal. In further cases, the control unit or terminal may control speed of flip, rotational angle of the flip, type of flip (e.g. left to right, front to rear), or other aspects of the flip. As an example, when an obstacle is detected to the left side of the UAV by a sensor, the UAV may increase the rotational speed of one or two propulsion units on the left-side of the UAV so that the left side may be lifted further up than the right side to avoid the obstacle. As another example, a UAV moves toward a tree branch and touches it within a user's eyesight; the user may enter a flip signal using a remote control with a selected flip angle, a selected flipping axis (e.g., FIGS. 13-15), and/or a radius of the arc defining flipping path. The selected flip angle may be, for example, 25 degrees, 30 degrees, 45 degrees, or any angle. The flip angle may be any angle that allows the UAV to safely avoid the obstacle. The flipping axis may be parallel to the roll axis. Any value of the radius of the arc may be contemplated. In some cases, the radius may be about 10 meters. The UAV may flip the selected flip angle about the selected flipping axis from its initial orientation to be right-side up (tilted from a vertical plane), thus it moves away from the tree branch.

Figure 2:
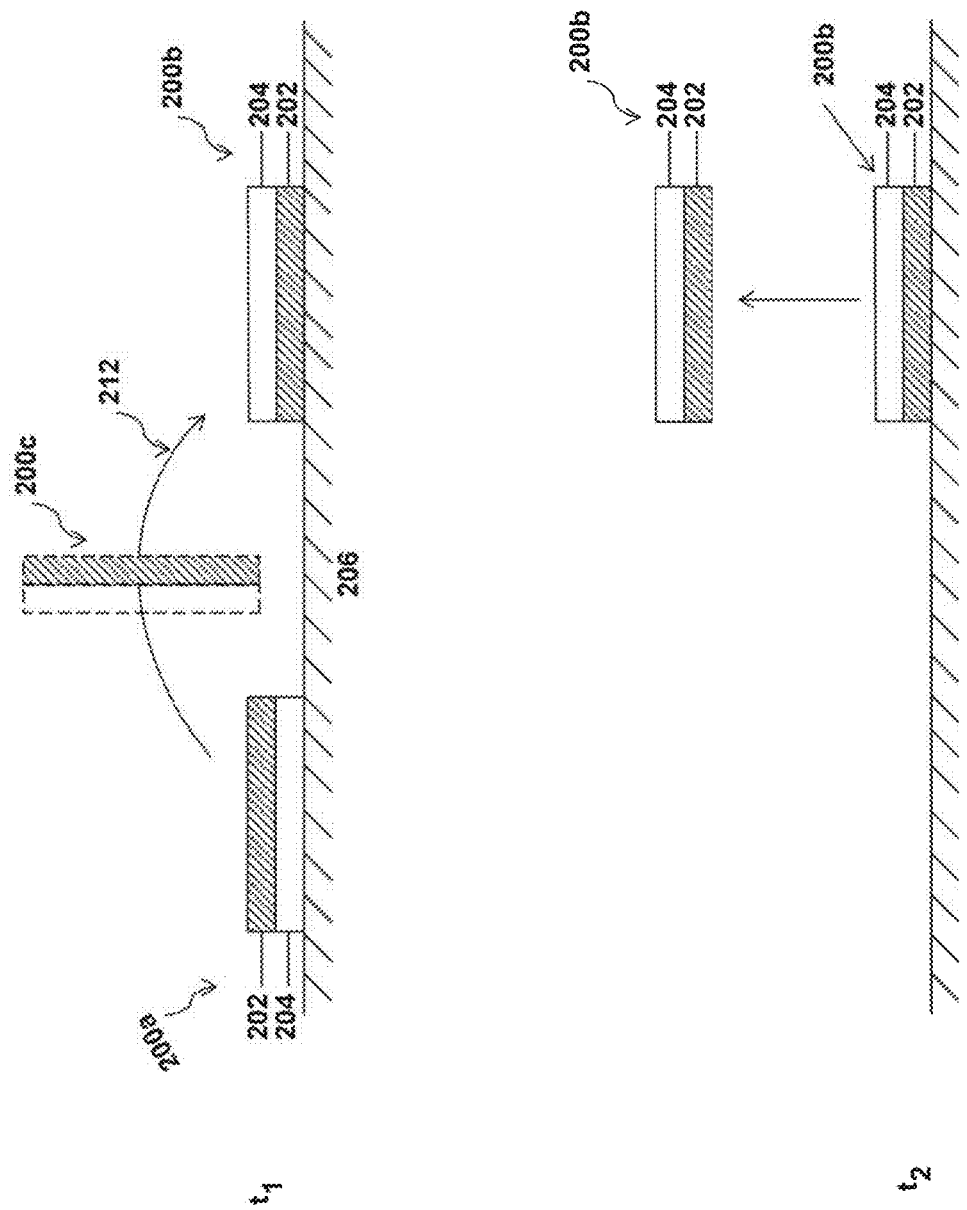
FIG. 2 shows a schematic view of a UAV changing its orientation on a horizontal landing surface, in accordance with embodiments of the present disclosure.

FIG. 2 shows a schematic view of a UAV changing its orientation on a horizontal landing surface, in accordance with embodiments of the present disclosure.

The UAV and elements therewithin may include a first orientation 200a and a second orientation 200b. When the UAV contacts an underlying surface or a landing surface 206 with its bottom portion 202 facing downward and its top portion 204 facing upward, the UAV may be in the second orientation 200b. Conversely, when the UAV is in the first orientation, the top portion 204 may be facing downward and the bottom portion 202 of the UAV may be facing upward. The UAV may change its orientation from 200a to 200b, or vice versa when it is on a landing surface. The first orientation and the second orientation may be opposite to each other with about a 180 degree difference. The UAV may be configured to perform a flip 212 from the first orientation to the second orientation at a certain time point $t_1$, or vice versa. The UAV may have an intermediate flight orientation 200c while it flips from the first to the second orientation, or vice versa. The UAV may takeoff after the flip at a certain time point $t_2$.

The UAV disclosed herein may be flipped from the first orientation 200a to the second orientation 200b opposite the first orientation while the UAV is on an underlying surface 206. Before initiation of the flip, the UAV may obtain data indicative of a user input to initiate the flip of the UAV from the first orientation to the second orientation. The user input may be received at a terminal remote to the UAV via a wireless connection. Alternatively, the UAV may obtain data from one or more sensors on-board the UAV to initiate the flip of the UAV from the first orientation 200a to the second orientation 200b. The one or more sensors may detect an orientation of the UAV. The first orientation of the UAV may be upside down while the second orientation of the UAV may be right side up. The UAV may be on the underlying surface for at least a moment in time after flipping to the second orientation. This may be advantageous to allow time for the UAV to check the functions of one or more of its components. Additionally, this may be advantageous for the UAV to detect and/or change the rotational speed or orientation of one or more rotating components to ensure safe flight. The time period (moment in time) may be about 0.1 second to about 100 seconds. The UAV may effect, with aid of the one or more propulsion units, takeoff of the UAV from the underlying surface subsequent to the flip of the UAV from the first orientation to the second orientation. The UAV may further effect flight of the UAV in the second orientation optionally after the flip.

The landing surface 206 may be any static or moving surface that is configurable to hold at least part of the weight of the UAV. The landing surface may be of different terrain. The landing surface may be flat, inclined (e.g., angle of inclination may be 5 degrees, 10 degrees, 15 degrees, 20 degrees, 25 degrees, 30 degrees, and so forth), declined, even, uneven, or at any angle to the horizontal plane. For example, the landing surface may be a roof, a tree branch, a ground, a floating object in the water, a water surface, a foliage covered surface, a rock surface, a grass-land, a swamp surface, an aircraft, a sand surface, or the like. The landing surface may be close or far from the user, the remote control, and/or the terminal. The landing surface may be in the user's eyesight or within the control range of the remote control and/or the terminal. The landing surface may be outside of the user's eyesight or outside of the control range of the remote control and/or the terminal.

The UAV may be on the landing surface 206 in the first orientation 200a, the second orientation 200b, or any other orientation it may have. The UAV may be placed on the landing surface for a new take off. Alternatively, the UAV may be controlled to land on the landing surface, or may be land on the landing surface unintentionally after a crash landing caused by external sources or internal malfunction of one or more of the elements.

The UAV may automatically detect its orientation on the landing surface with the assistance of one or more sensors. Each of the one or more sensors may sense one or more properties of the UAV or the environment surrounding the UAV. Such a property may include one or more properties at one or more physical locations of the UAV, selected from: a flight orientation, a spatial disposition, a velocity, an altitude, latitude, acceleration, a speed, a tilt angle, a height, a distance to an external subject. Such properties may be with respect to up to three degrees of translation and up to three degrees of rotation. Alternatively, the one or more sensors can be used to provide data regarding the environment surrounding the UAV, such as weather conditions, proximity to potential obstacles, location of geographical features, location of manmade structures, a wind speed, a wind direction, a rain speed, a temperature, and the like. Such environmental data are with respect to up to three degrees of translation and up to three degrees of rotation. Any sensor for collecting environmental information can be used, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any combination of active sensors (e.g., sensors that generate and measure energy from their own source) and passive sensors (e.g., sensors that detect available energy).

For example, the one or more sensors may be configured to sense the relative position of the bottom portion 202 to the top portion 204, and determine the orientation using a pre-defined database correlating positions of bottom and top portions to different orientations. As an example, inertial sensor like IMUs may detect the rotational movement of the UAV and by adding the rotational movement of the UAV to its initial orientation at its take off, the relative position of the bottom portion to the top portion may be determined. As another example, different proximity sensors may be used at the bottom and top portions of the UAV, thus, the height difference of the bottom and top portion to an external reference (e.g. a water surface, a roof) may be determined.

The UAV may determine if a flip or change of orientation is necessary or not based on its current orientation and the landing surface and may provide a signal to the one or more rotors. In some cases, disclosed herein are methods of operating an UAV. The method may include providing a signal optionally from a flight control unit, an electrical signal control unit, or the like on-board the UAV to one or more corresponding propulsion units, thereby controlling directions of rotation of a first set of rotating components and a second set of rotating components of the one or more propulsion units. In some cases, the first set of rotating components may be configured to rotate in a first direction and the second set of rotating components are configured to rotate in a second direction when the UAV is in a first orientation. Conversely, the first set of rotating components may be configured to rotate in the second direction and the second set of rotating components are configured to rotate in the first direction when the UAV is in a second orientation opposite the first orientation. The UAV may automatically generate the signal to effect a flip when a current orientation of the UAV does not permit it to start or resume flying within a predetermined period of time after it lands on the landing surface. The predetermined period time may be about 0.1 second to about 10 minutes. The UAV may also generate the signal if the landing surface obstructs it from flying or changing position. The one or more processors onboard or remote from the UAV may be configured to generate a signal to effect a flip to change orientation if the landing surface is in its route. The one or more processors onboard or remote from the UAV may be configured to generate a signal to effect a flip to change orientation when it crash landed on the landing surface and unintentionally flipped. The UAV may automatically determine if a flip or change of orientation is necessary or not based on its current orientation and the landing surface. Alternatively, a user may provide an input to the remote controller and/or terminal, to generate a signal for effecting a flip to change the orientation of the UAV. In other cases, a signal may be provided optionally from a remote control and/or terminal to one or more corresponding propulsion units, thereby controlling directions of rotation of a first set of rotating components and a second set of rotating components of the one or more propulsion units.

In some cases, the UAV may or may not be within a user's eyesight. As an example, a UAV may have crash landed onto a roof top and flipped 180 degrees from its initial orientation. The roof top may not within the user's view. In some instances, if the UAV cannot or does not resume flying from the roof top in a predetermined time period (e.g., within 10 seconds after the crash), the UAV may be configured to automatically initiate a flip of 180 degrees to revert to its initial orientation so that it can fly off from the roof top and resume flight. This automatic determination and completion of a flip may not require user control or intervention, and allows the UAV to be restored quickly back to flight. As another example, a UAV may fly near a tree and may be obstructed by tree branches/leaves. The UAV may be configured to detect surrounding "landing surfaces" and flip or rotate to an orientation which allows movement of the UAV along a route with fewer or no obstacles.

The UAV may flip or change orientation on the landing surface 206. The flip or change of orientation may include moving the UAV away from the landing surface in a rotating motion. The UAV may experience different rotation angle, angular velocity, angular momentum, different acceleration, force, resistance, or the like during the flip. The flip or change of orientation may include moving the UAV to land on the landing surface again after the rotating motion in the second orientation.

The flip may be controlled or effected without damage caused to the UAV by the landing surface or by the rotating motion. The flip may be controlled or effected based on the weight, size, shape of the UAV, and/or speed of the propulsion units so that the flip does not cause damage to the UAV or its components.

In some cases, the flip of the UAV may be about the roll axis, the pitch axis, the yaw axis, or any axis within an x-y plane, x-z plane, or y-z plane (axes and planes as shown in FIG. 1). With control of one or more rotor blades separately or together, the flip of the UAV may be controlled or effected. In particular, the control of one or more rotor blades 110a, 110b in FIG. 1 may include the rotating speed of one or more rotor blades and the direction of rotation of one or more rotor blades. For example, a UAV with four propulsion units may flip due to a crash and land on a surface in a first orientation 200a. When the UAV is in the first orientation, a first portion of the UAV 204 may be touching the landing surface 206 while a second portion 202 of the UAV may be facing the opposite direction. Two sets of rotor blades of propulsion units on the left side of the UAV may be controlled to rotate at a first speed, and the rotor blades of propulsion units on the right side of the UAV may be controlled to rotate at a second speed. The first and second speeds may be controlled so that the UAV can rotate about the roll axis (y axis in FIG. 1) to be left-side up, and the UAV may continue rotating and flip about 180 degrees. The UAV may be configured to rotate about the roll axis and flip at a substantially angular speed. Alternatively, the UAV may be configured to rotate about the roll axis and flip at variable angular speeds. During the flip, the rotor blades on a diagonal of the UAV (e.g., 124 in FIG. 1) may be rotating in a first direction, while rotor blades on the other diagonal (e.g. 126 in FIG. 1) may be rotating in an opposite direction from the first direction. After the flip, the second portion 202 may be touching the landing surface 206 while the first portion 204 may be facing upward. In this orientation, the UAV may take-off and resume flying properly. Alternatively, to initiate the flip, the left set of rotors along the diagonal 126 of the UAV may increase rotational speed to an extent such that the left portion of the UAV closest to the set of rotors view form the top moves up and later may cause flip of the entire UAV.

In some cases, the first portion 204 of the UAV is in contact with an underlying surface 206 when the UAV is in the first orientation 200a, and the second portion 202 of the UAV is in contact with the underlying surface when the UAV is in the second orientation 200b. In some cases, the first and second portions are laterally (e.g., along z axis in FIG. 1) opposite to each other relative to a horizontal plane (e.g., parallel to x-y plane in FIG. 1) passing through a body of the UAV. In some cases, the second portion 202 is located above the body in a direction of lift generated by the one or more propulsion units when the UAV is in the first orientation 200a. In some cases, the first portion 204 is located above the body in a direction of lift generated by the one or more propulsion units when the UAV is in the second orientation 200b. In some cases, the first orientation is for the UAV to be upside down. In some cases, the second orientation is for the UAV to be right-side up. In some cases, the UAV is capable of taking off from an underlying surface in the first orientation and in the second orientation. In some cases, the UAV is capable of hovering or flight when in the first orientation and in the second orientation.

The UAV may take-off after a flip or change of orientation. The UAV may fly away from the landing surface 206 after a flip or change of orientation. Alternatively, the UAV may hover above the landing surface after a flip. The UAV may fly with in any direction and/or along any motion path defined within a 3-dimensional space. The UAV may be capable of motion in six degrees of freedom.

The UAV may be configured to include an intermediate flight orientation 200c. The intermediate flight orientation may exist during a flip or change of orientation of the UAV from an orientation (e.g., 200a) to a different orientation (e.g., 200b). The UAV may be in the intermediate flight orientation for any time between 0.001 second to about 10 minutes. In the intermediate flight orientation, the UAV may be in the air. Alternatively, some portion of the UAV may be touching the underlying surface 206. The intermediate flight orientation may have about half of the difference in angle between before and after flip orientations (e.g. the first and second flight orientations). As an example, when the UAV flips about 180 degrees from the first to the second orientation, the intermediate orientation may have about 90 degrees to the first and the second flight orientation. The intermediate flight orientation may have about 10, 20, 30, 40, 50, 60, 70, 80, 90, 100, 110, 120, 130, 140, 150, 160, 170, 180, or any other number of degrees in difference to the first or the second flight orientation. The UAV may stay in the intermediate flight orientation for about 0.01 second to about 1000 seconds during its flip.

Figure 3:
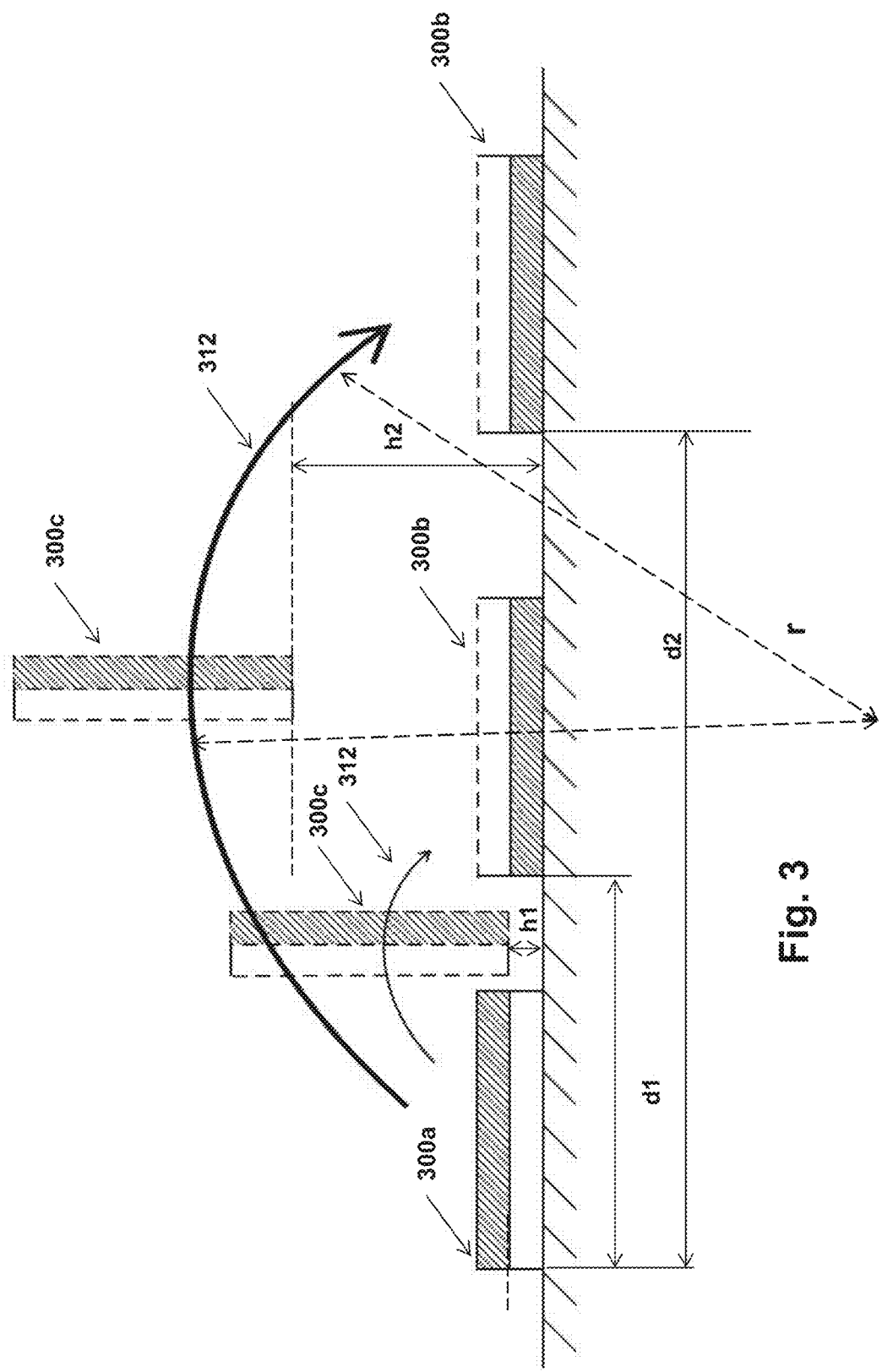
FIG. 3 shows a schematic view a UAV having different flip heights and radii, in accordance with embodiments of the present disclosure.

FIG. 3 shows a schematic view a UAV having different flip heights and radii, in accordance with embodiments of the present disclosure.

The embodiment in FIG. 3 may be similar to the embodiment in FIG. 2 except for the following differences. In FIG. 3, a UAV may be configured to adjust a flip or change of orientation while the UAV is on the ground such that the intermediate flight orientation 312 has different heights (e.g., h1 and h2) along a vertical direction. Similarly, the radius r of an arc defining the flip motion path of the UAV 312 may be different with different heights. Additionally, a UAV may be configured to adjust a flip or change of orientation such that the UAV after the change of orientation may land in locations at difference distances (e.g., d1 and d2) to the UAV before the flip. The UAV may be configured to effect such differences in the change of orientation with control of the rotational speeds and directions of one or more propulsion units thereby controlling the flipping speed, flipping acceleration, flipping height (e.g., h1 and h2), flipping distance (e.g., d1 and d2), flipping radius, flipping axis (FIGS. 13-15), and/or other parameters of the UAV. A radius of arc r (defining the UAV's motion path during the flip 312) may range from about 0 meter to about 0.3 meters. The flipping distance may range from about 0 meter to about 0.3 meters. The flipping height may range from about 0.2 meters to about 1 meter.

Such differences in change of orientation may be advantageous for the UAV to avoid external obstacles and ensure the success in change of orientation. As an example, the UAV may flip to a high enough intermediate orientation and then to a different flight orientation such that a bump on the underlying surface may be avoided. As another example, the UAV may flip to a location with a distance less than 0.01 meter to the UAV before the flip to avoid flipping and landing in water surface that is 0.03 m away and surrounding the UAV before the flip.

Figure 4:
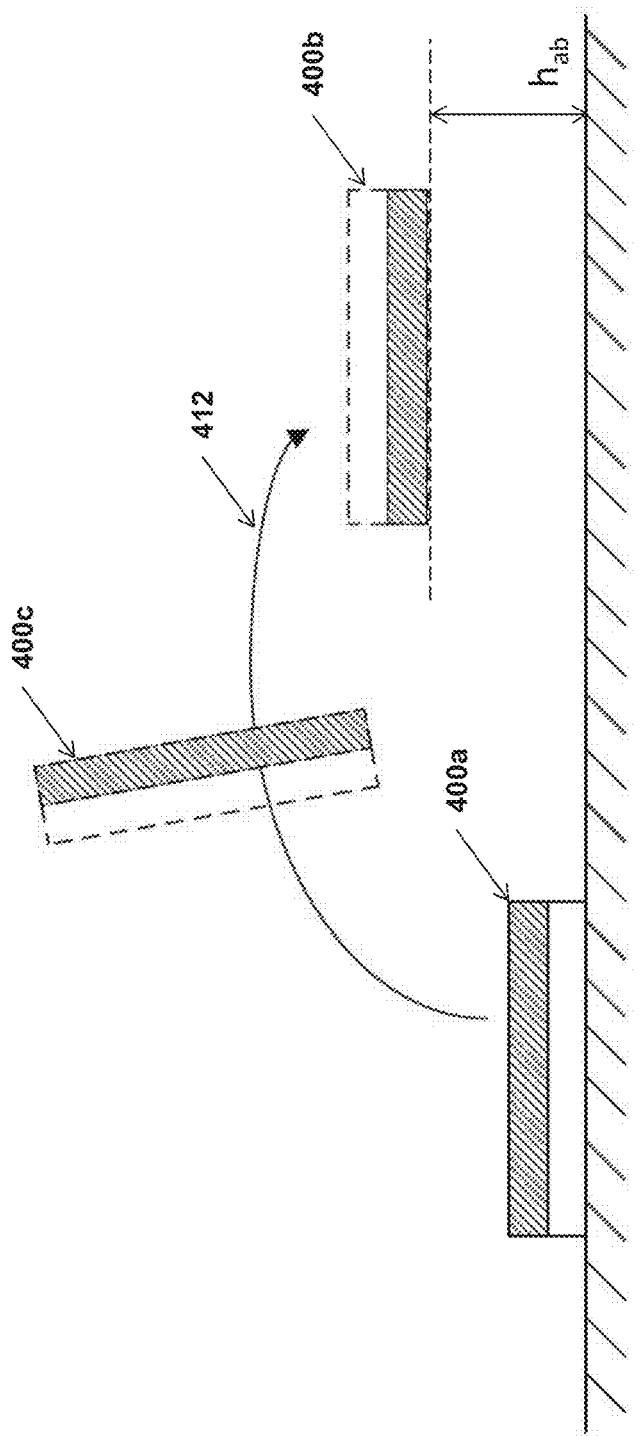
FIG. 4 shows a schematic view of a UAV changing its orientation while flipping from a landing surface to mid-air, in accordance with embodiments of the present disclosure.

FIG. 4 shows a schematic view of a UAV changing its orientation while flipping from a landing surface to mid-air, in accordance with embodiments of the present disclosure.

The embodiment in FIG. 4 may be similar to the embodiment in FIG. 2 except for the following differences. In FIG. 4, The UAV on the underlying surface may change orientation 412. During the change of orientation, the UAV may include an intermediate flight orientation 400c that is less than 90 degrees different from the first orientation 400a and more than 90 degrees from the second flight orientation 400b. At the second orientation after the flip, the UAV may be above the underlying surface with a height $h_{ab}$. The UAV may resume flying in the second flight orientation.

A radius of an arc (defining the UAV's motion path during the flip 412 may range from about 0.2 meters to about 0.5 meters. The height $h_{ab}$ may range from about 0.2 meters to about 0.5 meters above an underlying surface.

Such a flip 412 ending in a flight orientation in the air may be advantages to avoid external obstacles that may exist on the underlying surface if the UAV were to land on the underlying surface and/or obstructions that may exist on other flip motion path(s) the UAV may take. Additionally, such a flip may also ensure fast and efficient flight after the flip. As an example, the UAV may be configured to change orientation with a flip 412 to avoid underlying surface surrounding the UAV that is not appropriate for a flipped UAV to land on.

Figure 5:
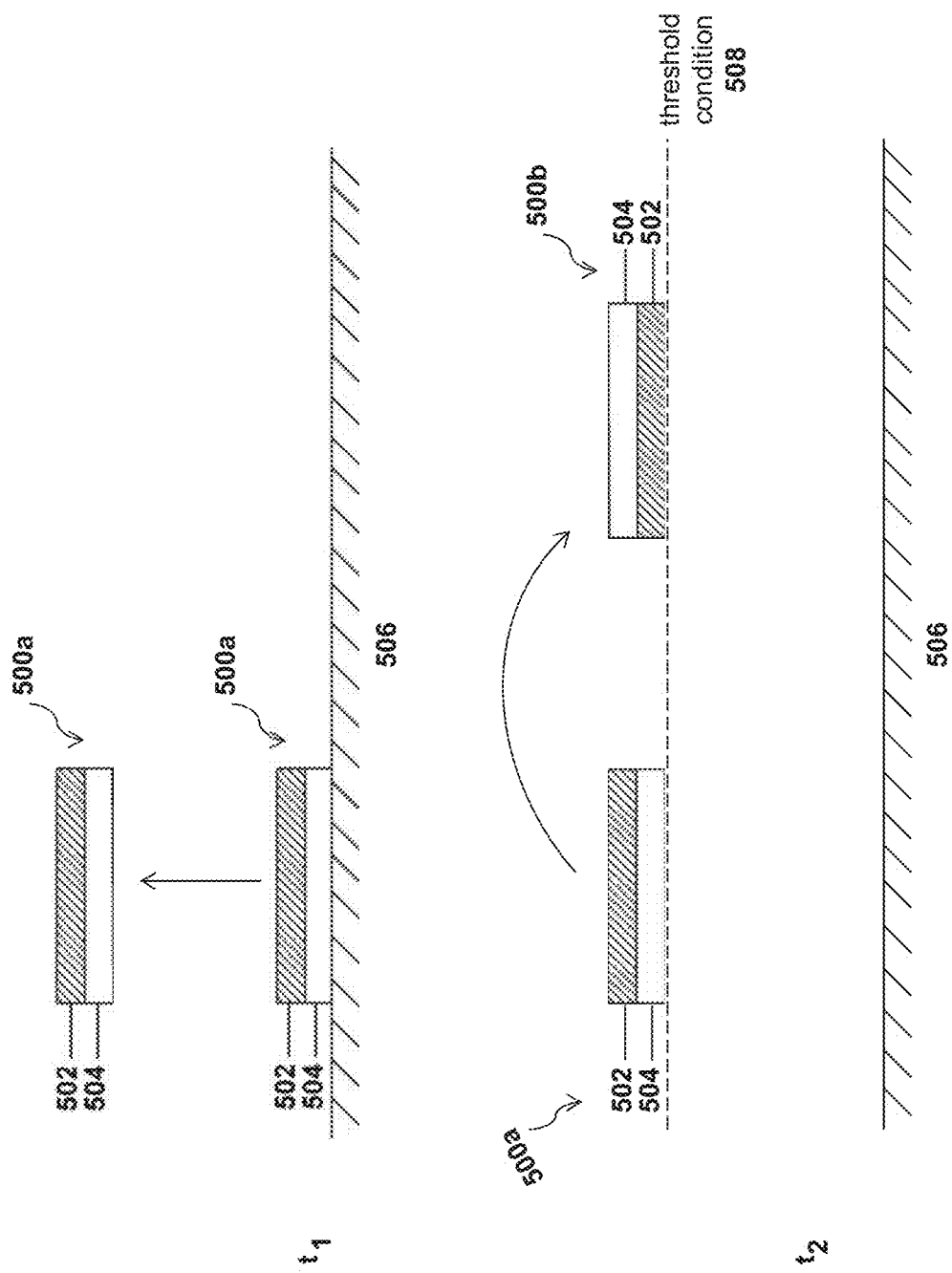
FIG. 5 shows a schematic view of a UAV changing its orientation while in flight in response to a detected threshold condition, in accordance with embodiments of the present disclosure.

FIG. 5 shows a schematic view of a condition under which the UAV may change orientation while in flight in response to a detected threshold condition, in accordance with embodiments of the present disclosure.

The UAV may be disposed in one or more orientations. In some embodiments, the orientations may include a first orientation 500a and a second orientation 500b. In some instances, after a crash landing, the UAV may be in the first orientation 500a in contact with an underlying surface or a landing surface 506, such that its second portion 504 is facing downward and its first portion 502 is facing upward relative to the underlying surface. The UAV may take off from the landing surface 506 in the first orientation. In some embodiments, when the UAV meets a threshold condition (e.g., a height threshold 508), the UAV may change its orientation from 500a to 500b. The UAV may then resume flying in the second orientation 500b, with the second portion 504 facing upward and the first portion 502 of the UAV facing downward. The first orientation and the second orientation may be parallel but laterally opposite to each other (e.g., about 180 degrees difference).

In some cases, the first portion 504 (e.g., top portion) of the one or more protective covers may be in contact with an underlying surface 506 when the UAV is in the first orientation 500a, and a second portion 502 (e.g., bottom portion) of the one or more protective covers may be in contact with the underlying surface when the UAV is in the second orientation 500b. In some cases, the first and second portions of the one or more protective covers may be laterally opposite to each other (e.g., along the z-axis in FIG. 1) relative to a horizontal plane (e.g., parallel to the x-y plane in FIG. 1) passing through a body of the UAV. In some cases, the second portion 502 may be located above the body in a direction of lift generated by the one or more propulsion units when the UAV is in the first orientation 500a. In some cases, the first portion 504 may be located above the body in a direction of lift generated by the one or more propulsion units when the UAV is in the second orientation 500b.

The UAV may flip from the first orientation 500a to the second orientation 500b opposite the first orientation when one or more sensors detect that the UAV has reached a threshold condition 508. The one or more sensors may be onboard the UAV and may be configured to detect whether the UAV has reached the threshold condition when the UAV is in flight. The threshold condition may be reached during flight of the UAV. As an example, the threshold condition may be an altitude of the UAV with respect to the underlying surface. Alternatively, the threshold condition may be a velocity or acceleration of the UAV with respect to the underlying surface, wherein the velocity or acceleration is a vertical velocity or acceleration of the UAV with respect to the underlying surface. Alternatively, the threshold condition may be power provided to the one or more propulsion units, or power consumed by the one or more propulsion units, an amount of time that has elapsed since the UAV has taken off from the underlying surface, or other conditions. Such power threshold condition may be used to prevent the rotor blades, motors, or other elements of the UAV. As an example, when one or more propulsion units reaches over 90% of the maximal power allowed in the UAV without effecting the desired motion in the UAV (e.g., when the UAV is trapped by an external obstacle), the power threshold is satisfied. The UAV may be configured to effect a change of orientation that may move the UAV away from the obstacle and resume proper operations. In some case, the one or more propulsion units permit the UAV to take off from the underlying surface regardless of orientation of the underlying surface relative to the direction of gravity, wherein the first orientation is for the UAV to be upside down and wherein the second orientation is for the UAV to be right side up. The UAV comprises one or more protective covers that prevent the one or more propulsion units from directly contacting the underlying surface. The underlying surface may be horizontal, included from the horizontal surface, declined from the horizontal surface, or a combination thereof.

The UAV may be on a landing surface 506 before it takes off, resumes flying, flip, or change its orientation. The landing surface may be any static or moving surface that is configurable to hold at least part of the weight of the UAV. The landing surface may be of different terrain. The landing surface may be flat, inclined, declined, even, uneven, or at any angle to the horizontal plane. For example, the landing surface may be a roof, a tree branch, a ground, a floating object in the water, a water surface, a foliage covered surface, a rock surface, a grass-land, a swamp surface, an aircraft, a sand surface, or the like. The landing surface may be close or far from the user, the remote control, and/or the terminal. The landing surface may be in the user's eyesight or within the control range of the remote control and/or the terminal. The landing surface may be outside of the user's eyesight or outside of the control range of the remote control and/or the terminal.

The UAV may be on the landing surface 506 in the first orientation 500a, the second orientation 500b, or any other orientation it may have. The UAV may be placed on the landing surface 506 for a new take off. Alternatively, the UAV may be controlled to land on the landing surface, or may land on the landing surface unintentionally after a crash landing caused by external sources or internal malfunction of one or more of the elements. In some cases, the landing surface and the surrounding environment may not be suitable for a flip or change of orientation on the landing surface. In other cases, the UAV may not be able to flip or change its orientation on the landing surface. Thus, instead of flipping or changing orientation on the landing surface, it may be desirable to allow the UAV to take off with its current orientation away from the landing surface, and then flip or change its orientation when it is airborne. For example, the landing surface may be determined to be too small for a flip or change of orientation. In some cases, the landing surface may not be flat or even so that a flip or change of orientation may be difficult. As another example, the landing surface may be moving very fast or slippery so that a flip may be difficult. The UAV may detect environment surrounding it (especially the landing surface) and/or its orientation to automatically determine if a flip or change of orientation is suitable on the landing surface or not. If not, the UAV may take off first and then flip in the air when it receives a signal from a user, a controller, and/or a terminal, or alternatively when it detects a threshold condition. As an example, the environment (e.g. location) can be determined based on a number of GPS satellites in communication with the GPS sensor. As another example, the environment can be determined based on time-of-flight data obtained by the lidar sensor. As another example, the environment type (obstacles in flight route) can be determined based on image data obtained by the vision sensor, such as an exposure time associated with the image data obtained by the vision sensor.

In some cases, the UAV is capable of taking off from an underlying surface in the first orientation and in the second orientation. In some cases, the UAV is capable of hovering or flight when in the first orientation and in the second orientation.

The UAV and methods disclosed herein may generate lift for the UAV by controlling the directions of the first (e.g. 1, 4 in FIG. 6) set and second set (e.g., 2, 3 in FIG. 6) of rotating components of the one or more propulsion units to generate a lift for the UAV. Each rotating component disclosed herein may include a rotor blade or a set of rotor blades (or rotor blades). In some embodiments, the UAV and methods disclosed herein may include generating a lift for the UAV when the UAV is taking off from an underlying surface when the UAV is in the first orientation or the second orientation (top panel in FIG. 5).

For a take-off from a landing surface 506, it may occur after any types of UAV actions that resulted in the UAV being on the landing surface. Non-limiting examples includes a successful flip, an attempted but failed flip, a landing, powered on but idling on the landing surface, moving along the landing surface, a crash to the landing surface, or the like. For a take-off from a landing surface, the UAV may take a sequence of actions that let the UAV move away from the surface. In some cases, the UAV may hover on the landing surface followed by flying with vertical movements. As another example, the UAV may fly directly away from the landing surface with a combination of vertical, horizontal, and/or curved movements.

The take-off may occur automatically with or without the aid of one or more sensors. The UAV may determine if a flip or change of orientation is necessary based on its current orientation and the landing surface. If a flip or change of orientation is desired but the landing surface, the surrounding environment, and/or the condition of the UAV may be not suitable for a flip or change of orientation on the landing surface, the UAV may automatically determine to take-off from the landing surface. The take-off may be controlled by a user, a controller, and/or a terminal. The UAV may take-off after it receives a signal from a user, a controller, and/or a terminal.

In some cases, a signal (either from a remote control and/or terminal or from the UAV) may be provided to one or more corresponding propulsion units, thereby controlling directions of rotation of a first set of rotating components and a second set of rotating components of the one or more propulsion units. The signal may be generated upon detection of a threshold condition 508 using one or more sensors as disclosed herein. As an example, a height threshold can be determined based on a number of GPS satellites in communication with a GPS receiver onboard the UAV. As another example, an obstacle within a threshold distance to the UAV may be detected using an ultrasound sensor.

The UAV may flip or change orientation when the threshold condition 508 is detected or met. A threshold condition may be one or more conditions that may occur to the UAV or elements therewithin when accidental conditions such as a malfunction, a loss of power, a loss of communication, a loss of control, encounter of obstacle(s) or resistance occur. The threshold condition may be user-selected or pre-programmed into the UAV. A threshold condition may be entered into the UAV before or during an operation of UAV. The threshold condition may vary or remain constant during operation of the UAV. In some instances, the threshold condition may adaptively change based on the surrounding environment of the UAV. The threshold condition may be set or changed by at least one of a processor, a smart device, a controller, a terminal, a digital processing device, a cloud, a database, an algorithm, an application, computer software, a user, a manufacturer of the UAV, or the like.

As an example, a threshold condition 508 may be met when an external object is detected within a pre-determined distance of the UAV. Alternatively, a threshold condition may be met when the UAV contacts an external object. Optionally, a threshold condition may include an altitude, a height, acceleration, latitude, or a speed of the UAV greater than or less than a predetermined value. A threshold condition may be detecting a rotational speed of rotor blade(s) to be less than or greater than a pre-selected speed. As another example, a threshold condition may be detecting a predetermined change in altitude, height, acceleration, latitude, speed of the UAV greater than or less than a predetermined value within a certain period of time. As another example, a threshold condition may be failure to achieve a predetermined change in altitude, height, acceleration, latitude, speed of the UAV greater than or less than a predetermined value within a preselected period of time. A threshold condition may be detecting a predetermined change in rotational speed of at least one rotor blades to be less than or greater than a pre-selected speed. A threshold condition may be failure to achieve a predetermined change in rotational speed of at least one rotor blades to be less than or greater than a pre-selected speed. As another example, the UAV may flip or change its orientation after an unwanted change in orientation is introduced by external sources, for example, a strong wind.

The UAV may detect a threshold condition 508 using one or more sensing units or sensors as disclosed herein. Each of the sensors may be located on the UAV, at one or more different locations of the UAV, or remotely away from the UAV. A sensor may be located on one or more different locations including: the central body 102, the rotor 110*a*, 110*b*, the protective cover 106, and the support 108. Each sensor may directly sense one or more properties of the UAV or the environment surrounding the UAV. Alternatively, each sensor may sense and convert sensing data (by itself or by other digital processing devices onboard the UAV or remotely located from the UAV) into one or more properties of the UAV or of the environment surrounding the UAV. Non-limiting examples of such a property may be a flight orientation, a spatial disposition, a velocity, an altitude, latitude, acceleration, a speed, a tilt angle, a height, and a distance to an external subject. In some instances, properties indirectly or directly sensed by a sensor are up to three degrees of translation and up to three degrees of rotation. The one or more sensors may include global positioning system (GPS) sensors, motion sensors, inertial sensors, proximity sensors, ultrasonic sensors, infrared sensor, ultraviolet sensor, image sensors, electromagnetic emission sensors, radar, or any other sensors. As an example, the GPS sensor may sequentially sense a position of the UAV on a landing surface 506 and then one or more positions of the UAV while flying, then a processor, a control unit, or the like may compare positions of the UAV at different time points to determine a height or a distance of the UAV to the landing surface 506. The detected height may be compared to a threshold height and see if the threshold condition has been met or not.

Alternatively, a sensor can be used to provide data regarding the environment surrounding the UAV, such as weather conditions, proximity to potential obstacles, location of geographical features, location of manmade structures, a wind speed, a wind direction, a rain speed, a temperature, and the like. Such environmental data may be up to three degrees of translation and up to three degrees of rotation. For example, the one or more sensors may sense the relative position of the bottom portion 502 to the top portion 504 of the UAV, and determines the orientation using a pre-defined database correlating positions of bottom and top portions to different orientations.

The UAV may sense its orientation (e.g., 500a or 500b), or a change of orientation using one or more sensing units. The sensing unit may be a sensor as disclosed herein. The sensing unit may be any number of sensors. The sensing unit may be located on the UAV or off-board of the UAV. In some cases, the sensing unit is a combination of any number of sensors on the UAV and any number sensors off from the UAV. The sensors may directly sense data selected from: position, position change at two time points, translational velocity, translational velocity change at two time points, translational acceleration, change in translational acceleration at two time points, orientation, angular velocity, change in angular velocity at two time points, angular momentum, change in angular momentum at two time points, angular acceleration, change in angular acceleration at two time points, rotor blades speed, rotor blades frequency, rotating direction of rotor blade(s) or any combinations thereof up to three degrees of translation and up to three degrees of rotation. The sensors may sense data that may be used to derive or generate information regarding the above-listed data. Data sensed by and collected from the sensors are optionally processed so that they may be analyzed at a certain confidence level. The processed or unprocessed raw data from one or more sensors may be analyzed to yield orientation of the UAV. The optional processing or analysis of data may include any data processing methods that may be selected from but may not be limited to: de-noise, segmentation, pattern recognition, statistical analysis, truncation, filtering, sampling, algebraic operation, frequency analysis, thresholding, compression, decompression, encryption, decryption, and signal transformation.

Being able to determine whether a threshold condition 508 has been met without requiring any external signals may advantageously permit the UAV to operate independent of many environmental factors. For example, not requiring a GPS input may permit the aerial vehicle to operate in indoor or outdoor conditions where GPS signals may otherwise be blocked or unreliable. In another example, not requiring feedback from outside the vehicle (for example, sensors that may require an echo to determine altitude of the UAV), may diminish risks of interfering signals occurring, or having environmental factors such as moving parts (for example, leaves blowing in the wind) reducing the reliability of the echoed signal. The systems and methods described herein are also simple and do not require very many complicated calculations that can take more time or processing power. The systems and methods provided herein may provide conditions that may be easily evaluated without performing complex calculations that may be used in systems that look at various relative position and movement information compared to an outside reference. The UAV may determine whether the threshold condition is met or not based on information that is provided on-board the aerial vehicle without requiring external signals. This may provide a smooth, assisted takeoff-then-flip or flip-then-take-off sequence of actions for the UAV in a wide variety of environmental conditions.

Threshold conditions 508 with or without combination of one or more properties of the UAV or its environment may trigger different control to achieve a flip. Such difference in control to achieve a flip may protect the UAV from failure in actions and/or possible damages caused by the failure, thus increase the reliability and safety of the UAV and the elements therewithin. In some cases, when a UAV reaches a threshold height, the UAV may automatically control to flip in an optimal speed ranging when the wind resistance is low, and the lift is sufficient. As another example, when a UAV detects a threshold wind resistance or wind speed, it may automatically flip in a direct so as to reduce wind resistance during operation. As another example, when reaching a threshold condition of touching an external object, the sensors may detect where the external object is with respect to the fly route, and the UAV may flip and result in a location away from the external object. Such control may be automatic with assistance from the sensor(s) or by external control from a user.

The flip may be controlled or effected without damaging impact to the UAV by the motion. The flip may be controlled or effected based on the weight, size, shape of the UAV, and/or maximal speed of the propulsion units so that the flip does not cause damages to the UAV or its elements therewithin.

With control of one or more rotor blades separately or together, the flip of the UAV may be controlled or effected. In particular, the control of one or more rotor blades may include the rotating speed of one or more rotor blades and the direction of rotation of one or more rotor blades. Further control of the rotor blades may include the blade pitch of one or more rotor blades. As an example, rotor blades of propulsion units on the top left and bottom right of the UAV may be controlled to rotated in a clockwise direction at two different speeds, and the rotor blades of propulsion units on the top right and bottom left side of the UAV may be controlled to rotate in a counter clockwise direction at a same speed (when viewed from the top or the bottom of the UAV), and the speed of each propulsion unit may be controlled so that the top-left side of the UAV rolls upward at a constant speed while the bottom right of the UAV rolls downward and finally cause a flip of the UAV about an axis within the x-y plane (as in FIG. 1).

The flip of the UAV may result in rotational movement, translational movement, horizontal movement, vertical movement or their combinations to the UAV. The central body of the UAV may be at a different or a same location in three dimensions after a flip. During the flip, the UAV may have translational movement, rotation movement, horizontal movement, vertical movement or their combinations.

The UAV may automatically detect the threshold condition 508 without external signals. Automatic control of the UAV's flip may be advantageous so that the effect of action is not limited by the user's eyesight, and the may not be influenced if the UAV is out of the data communication range or if the user is novice. Such automatic detection may be fast as the communication is only within the UAV, it may be more efficient and simpler as it does not require any external input and/or control, and/or it may be more reliable as failure in communication to the external control or in the external control does not affect the automatic detection at the UAV.

Manual control of the UAV's flip may be advantageous when one or more elements of the automatic detection fail under different circumstances. Manual control of the flip may be advantageous when the user is experienced. Manual control of the flip may be advantageous when the user has a better perception of surrounding environment. Manual control of the flip may be advantageous when the surrounding environment is too complicated for automatic control to handle or automatic control is able to perform a flip.

Figure 6:
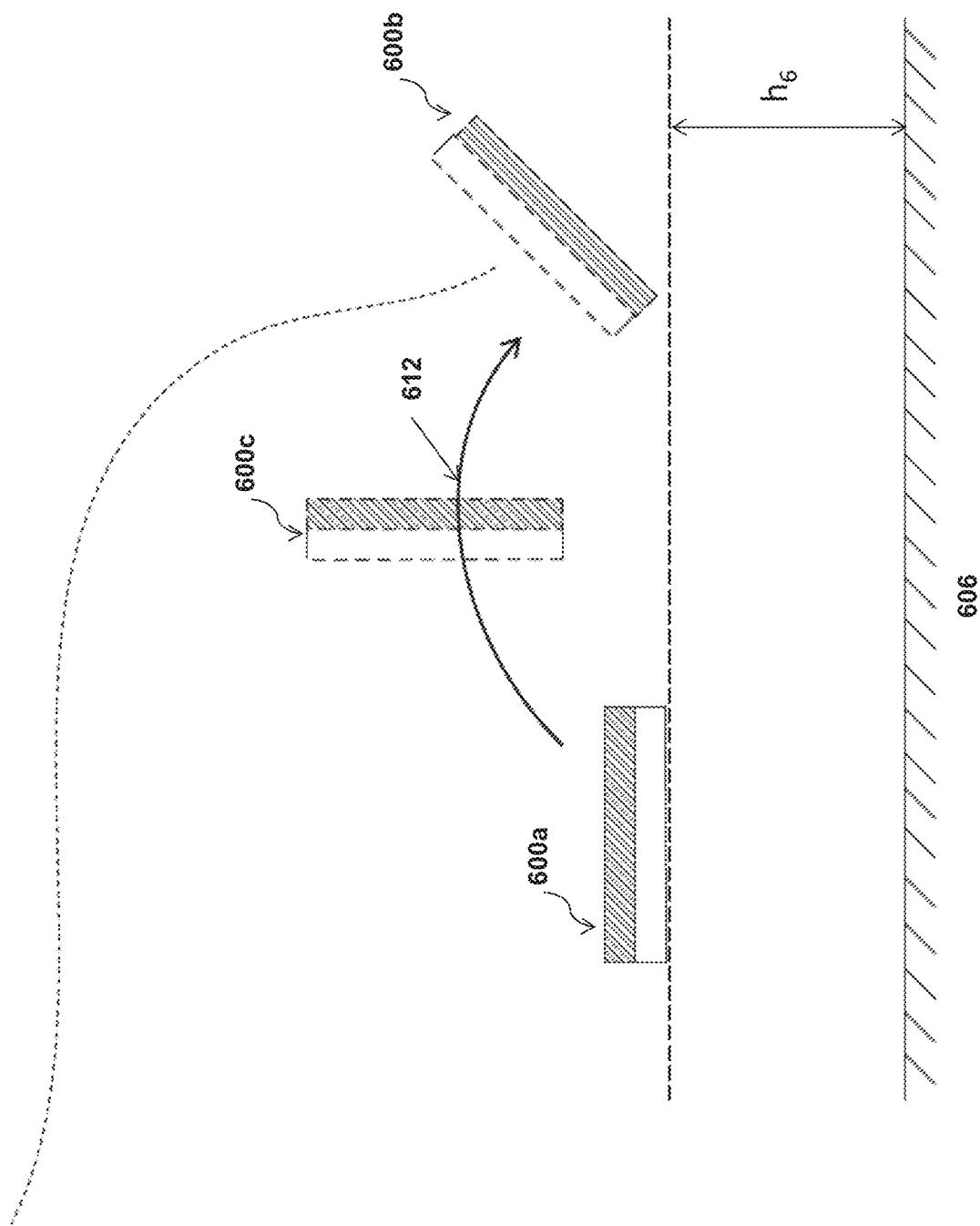
FIG. 6 shows a schematic view of a UAV changing its orientation during flight, in accordance with embodiments of the present disclosure.

FIG. 6 shows a schematic view of a UAV changing its orientation during flight, in accordance with embodiments of the present disclosure.

The embodiment in FIG. 6 may be similar to the embodiment in FIG. 5 except for the following differences. In FIG. 6, the UAV may change orientation while in flight, at a height greater than threshold height $h_6$ to an underlying surface 606, to a second flight orientation 600b that may not be about 180 degrees different from the first flight orientation 600a and above an underlying surface. The UAV may resume flying at the second flight orientation. During the flip 612, the UAV may include an intermediate flight orientation 600c that may be 90 degrees different from the first flight orientation and less than 90 degrees different from the second flight orientation.

The second flight orientation may be about 91, 100, 110, 120, 130, 140, 150, 160, 170, 180, 190, 200, 210, 220, 230, 240, 250, 260, or 269 degrees different from the first flight orientation. Alternatively, the second flight orientation may at any angle greater than 1 degree from the first orientation. The intermediate flight orientation may be at any angle that is smaller than the difference between the first and the second flight orientation. An angle of flip 612 may range from about 91 to about 269 degrees. A radius of an arc (defining the UAV's motion path during the flip) may range from about 0.2 meter to about 0.5 meters. The height $h_6$ may range from about 0.2 meters to about 0.6 meters above the underlying surface.

A second flight orientation with various angle differences to the first flight orientation may be advantageous for avoiding external obstacles and for resuming flight in various directions and along different flight paths.

Figure 7:
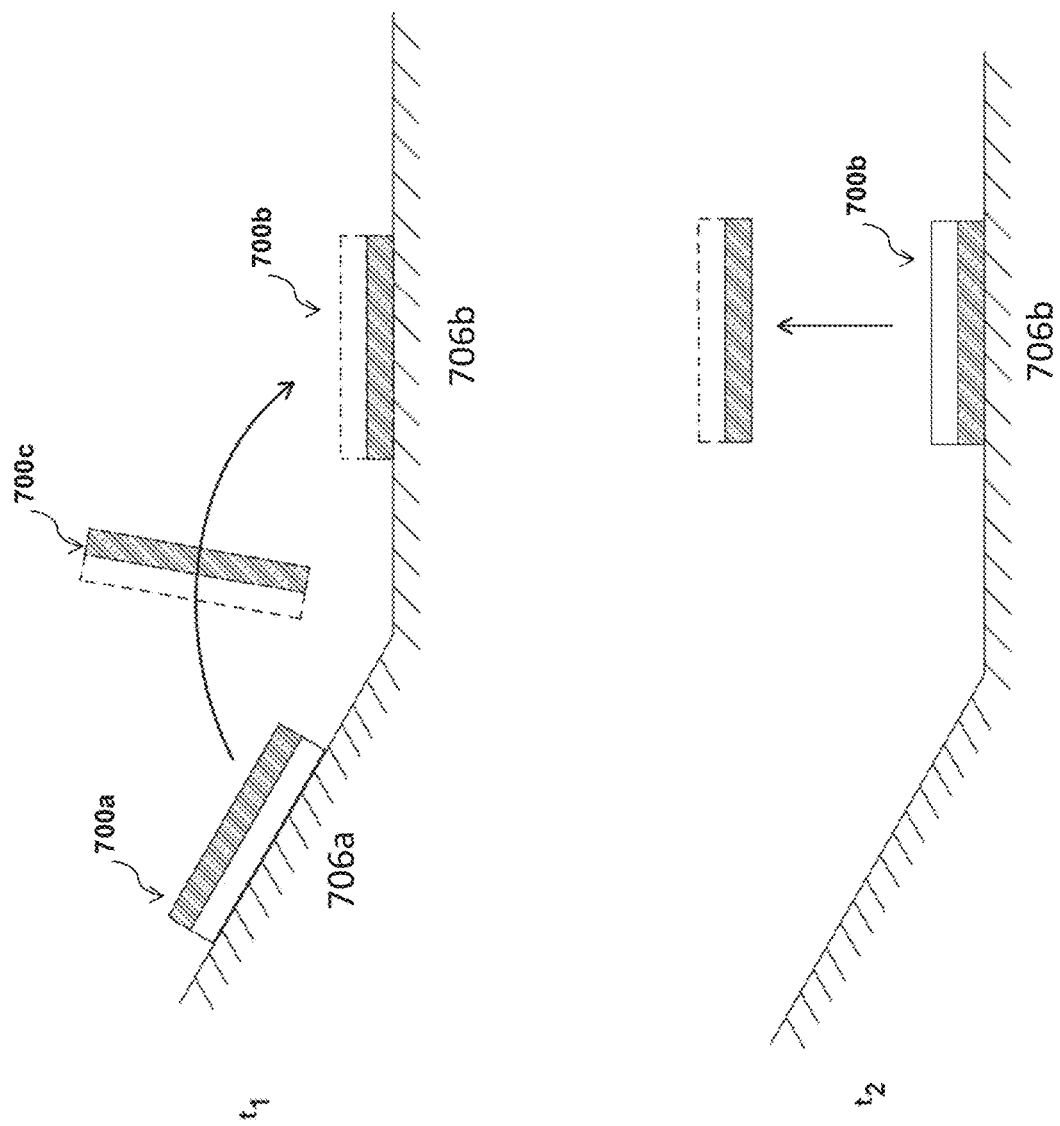
FIG. 7 shows a schematic view of a UAV changing its orientation when flipping from an upward sloping surface to a horizontal landing surface, in accordance with embodiments of the present disclosure.

FIG. 7 shows a schematic view of a UAV changing its orientation when flipping from an upward sloping surface to a horizontal landing surface, in accordance with embodiments of the present disclosure.

The embodiment in FIG. 7 may be similar to the embodiment in FIG. 2 except for the following differences. In FIG. 7, the UAV in the first orientation 700a may be configured to flip from a first inclined surface 706a to a horizontal surface 706b in a second orientation 700b. The first inclined surface may be sloped in an upward manner from the horizontal surface by about 30 degrees. An angle of flip 712 may range from about 89 to about 179 degrees. A radius of arc (defining the UAV's motion path during the flip) may range from about 0.2 meters to about 0.6 meters.

In some embodiments, the UAV may be in contact with the horizontal surface after the flip. During the flip, the UAV may include an intermediate flight orientation 700c that may be less than 90 degrees different from the first flight orientation and less than 90 degrees different from the second flight orientation. Alternatively, the intermediate flight orientation may be at any angle that is smaller than the difference between the first and the second flight orientation.

Figure 8:
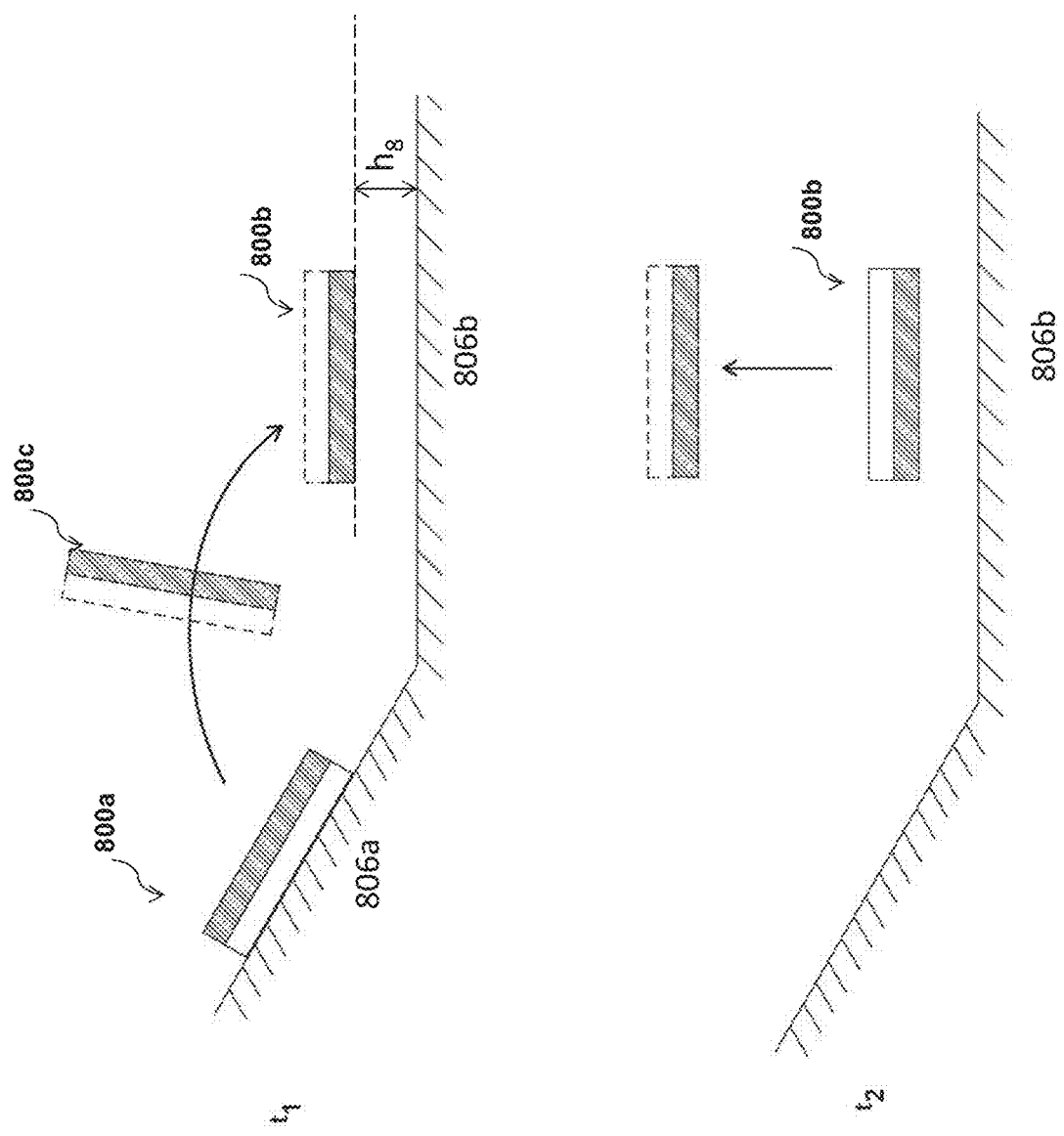
FIG. 8 shows a schematic view of a UAV changing its orientation when flipping from an upward sloping surface to mid-air, in accordance with embodiments of the present disclosure.

FIG. 8 shows a schematic view of a UAV changing its orientation when flipping from an upward sloping surface to mid-air, in accordance with embodiments of the present disclosure.

The embodiment in FIG. 8 may be similar to the embodiment in FIG. 7 except for the following differences. In FIG. 8, the UAV in the first orientation 800a may be configured to flip from a first inclined surface 806a to be in a second orientation 800b. The first inclined surface may be sloped in an upward manner from the horizontal surface by about 30 degrees. The UAV may be configured to flip from the first inclined surface to be in flight at a height $h_8$ above the surface 806b. An angle of flip may range from about 89 to about 179 degrees. A radius of arc (defining the UAV's motion path during the flip) may range from about 0.2 meters to about 0.6 meters. In the embodiment of FIG. 8, the UAV may be in the air and need not be in contact with the horizontal surface 806b after the flip. During the flip, the UAV may include an intermediate flight orientation 800c that may be less than 90 degrees different from the first flight orientation and less than 90 degrees different from the second flight orientation. Alternatively, the intermediate flight orientation may be at any angle that is smaller than the difference between the first and the second flight orientation.

Figure 9:
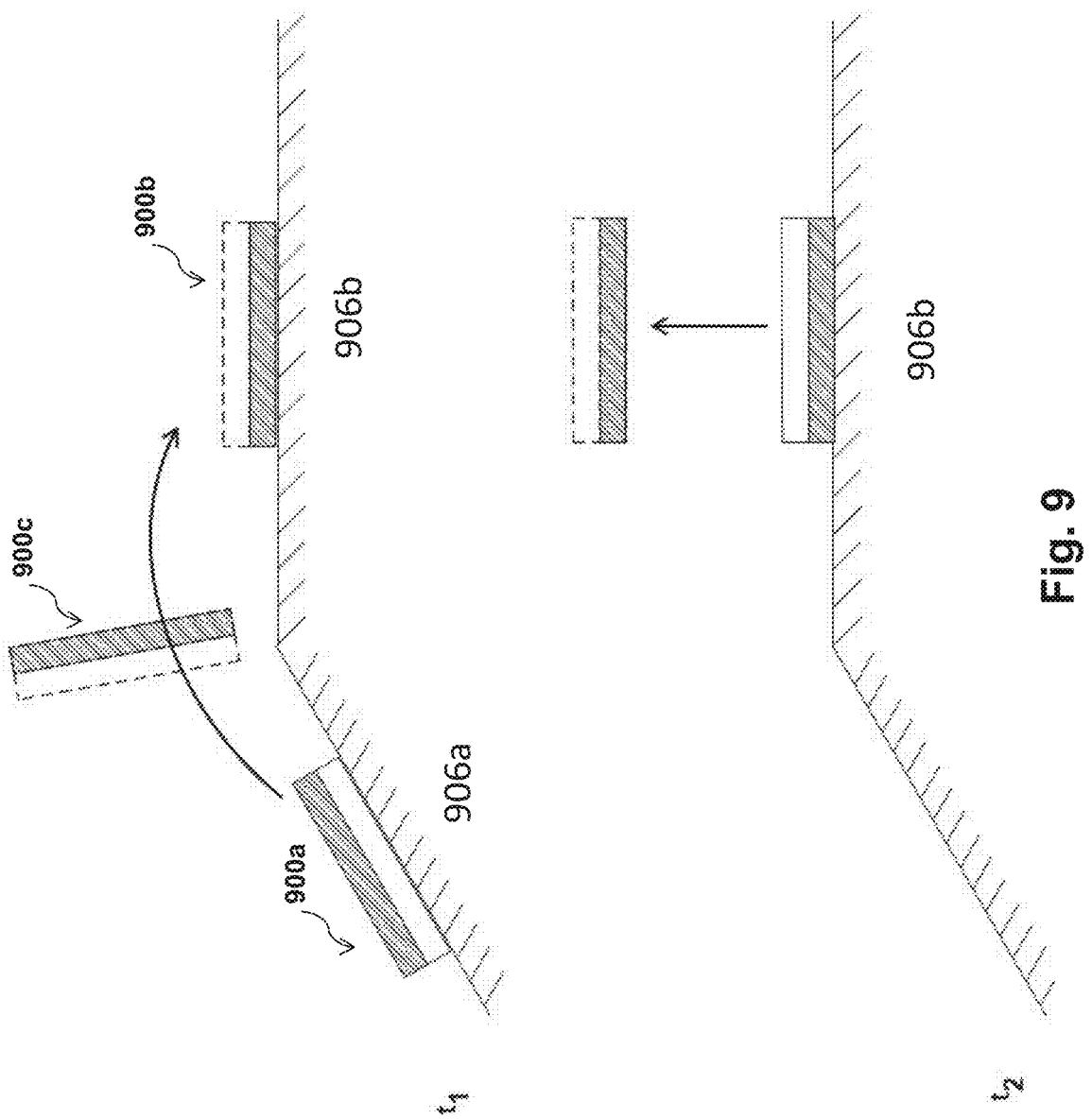
FIG. 9 shows a schematic view of a UAV changing its orientation when flipping from a downward sloping surface to a horizontal landing surface, in accordance with embodiments of the present disclosure.

FIG. 9 shows a schematic view of a UAV changing its orientation when flipping from a downward sloping surface to a horizontal landing surface, in accordance with embodiments of the present disclosure.

The embodiment in FIG. 9 may be similar to the embodiment in FIG. 7 except for the following differences. In FIG. 9, the UAV in the first orientation 900a may be configured to flip from a first declined surface 906a to a horizontal surface 906b in a second orientation 900b. The first declined surface may be sloped in a downward manner from the horizontal surface by about 35 degrees. The UAV may be configured to flip from the first declined surface to the horizontal surface. An angle of flip may range from about 181 to about 269 degrees. A radius of arc (defining the UAV's motion path during the flip) may range from about 0.2 meters to about 0.6 meters. In some embodiments, the UAV may be in contact with the horizontal surface after the flip. The UAV may then resume flying in the second flight orientation from the horizontal surface. During the flip, the UAV may include an intermediate flight orientation 900c that may be greater than 90 degrees different from the first flight orientation and greater than 90 degrees different from the second flight orientation. Alternatively, the intermediate flight orientation may be at any angle that is smaller than the difference between the first and the second flight orientation.

Figure 10:
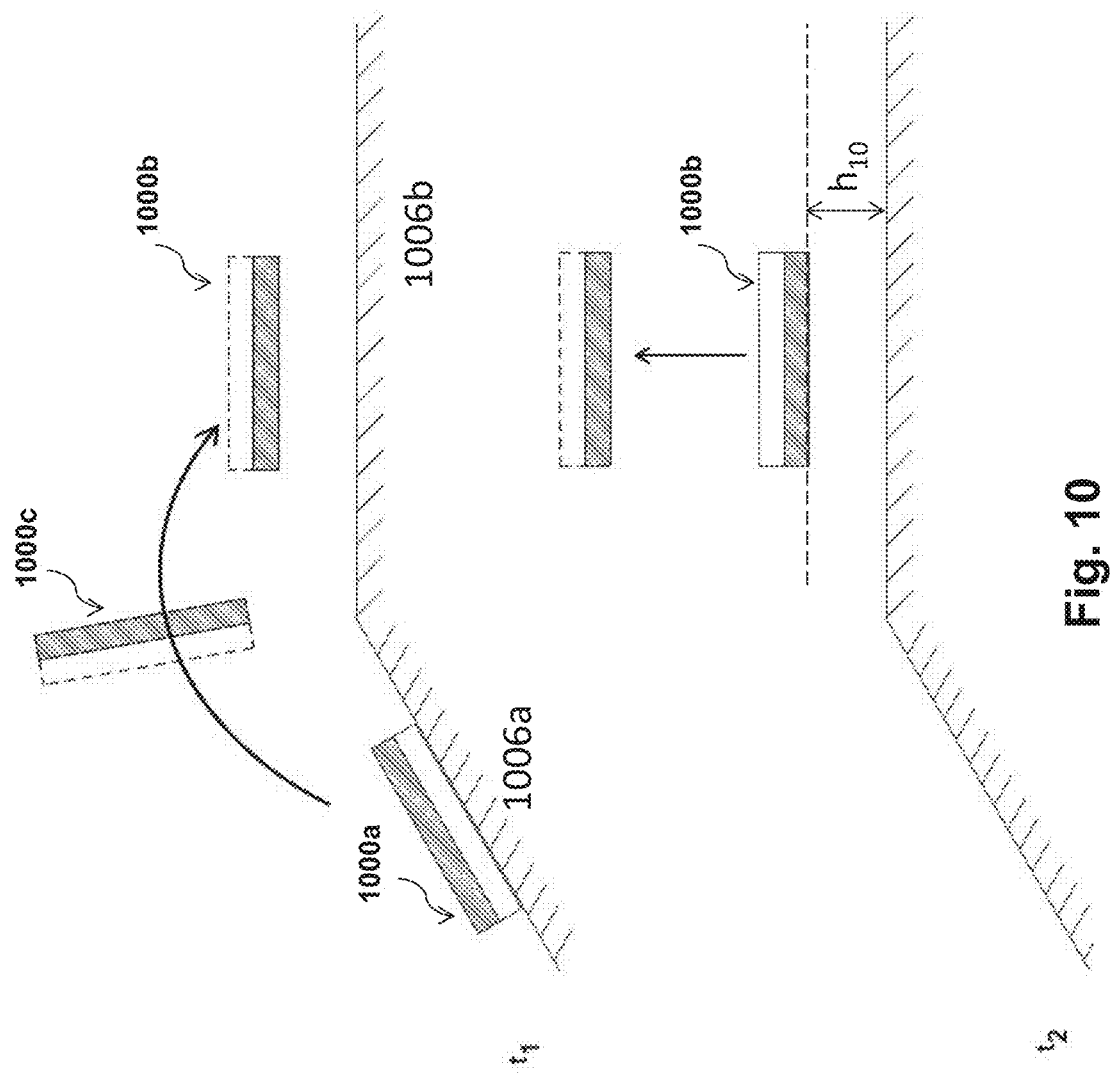
FIG. 10 shows a schematic view of a UAV changing its orientation when flipping from a downward sloping surface to mid-air, in accordance with embodiments of the present disclosure.

FIG. 10 shows a schematic view of a UAV changing its orientation when flipping from a downward sloping surface to mid-air, in accordance with embodiments of the present disclosure.

The embodiment in FIG. 10 may be similar to the embodiment in FIG. 9 except for the following differences. In FIG. 10, the UAV in the first orientation 1000a may be configured to flip from a first declined surface 1006a to a horizontal surface 1006b in a second orientation 1000b. The first declined surface may be sloped in a downward manner from the horizontal surface by about 25 degrees. The UAV may be configured to flip from the first declined surface to the horizontal surface. An angle of flip may range from about 181 to about 269 degrees. A radius of an arc (defining the UAV's motion path during the flip) may range from about 0.2 meters to about 0.6 meters. In the embodiment of FIG. 10, the UAV may be in flight and need not be in contact with the horizontal surface after the flip. The UAV may then resume flying in the second flight orientation at a height $h_{10}$ above the horizontal surface. During the flip, the UAV may include an intermediate flight orientation 1000c that may be greater than 90 degrees different from the first flight orientation and greater than 90 degrees different from the second flight orientation. Alternatively, the intermediate flight orientation may be at any angle that is smaller than the difference between the first and the second flight orientation.

Figure 11:
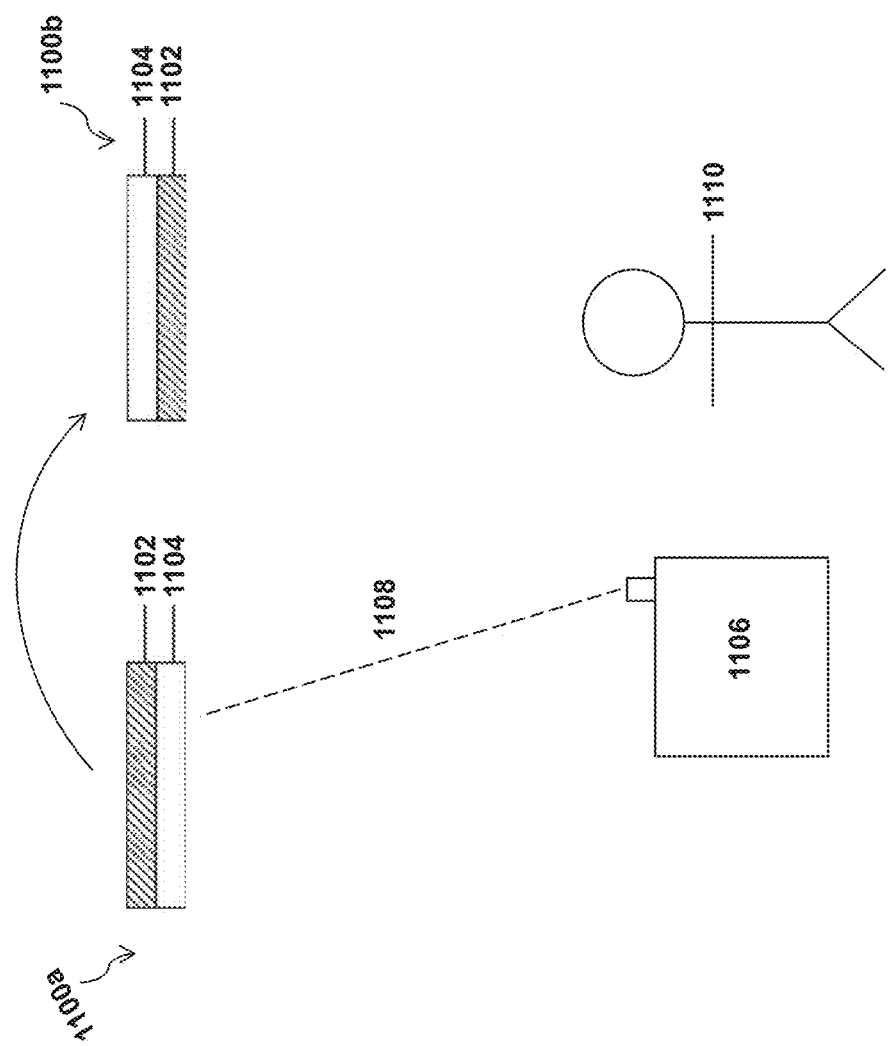
FIG. 11 shows a schematic view of a UAV changing its orientation in response to a user command, in accordance with embodiments of the present disclosure.

FIG. 11 shows a schematic view of a UAV changing its orientation in response to a user command, in accordance with embodiments of the present disclosure.

A user 1110 may communicate with a UAV using a controller 1106. The UAV initially in a first flight orientation 1100a with its bottom portion 1102 facing upward, and its top portion 11011 facing downward may receive a wireless signal 1108 from the user 1110 and may flip into a second flight orientation 1100b with its bottom portion 1102 facing downward, and its top portion 1104 facing upward and resumes flying after the flip. The user command may initiate the flip of the UAV while the UAV may be on the ground, taking off, landing, or flying regularly.

The UAVs and/or the methods disclosed herein may include a signal that is indicative of a user input to initiate the flip of the UAV. The user input is provided via a user terminal remote 1106 to the UAV. In some cases, the signal is generated at the user terminal and transmitted via one or more communication channels 1108 from the user terminal to the UAV. In some cases, the user input to initiate the flip may only be capable of initiating the flip and no other actions by the UAV. In further cases, the flip of the UAV from the first orientation 1100a to the second orientation 1100b causes a change in at least 170 degrees of the orientation of the UAV. The first orientation may be for the UAV to be upside down while the second orientation may be for the UAV to be right side up. In some cases, the user input may be a single action that effects the flip of the UAV from the first orientation to the second orientation. The signal indicative of the user input may be obtained while the UAV is on an underlying surface or in flight.

The UAV may comprise one or more protectors that prevent the one or more propulsion units from directly contacting the underlying surface With control of one or more rotor blades separately or together, the flip of the UAV may be controlled or effected, either automatically or manually by a user 1110 via a remote control 1106. In particular, the control of one or more rotor blades may include the rotating speed of one or more rotor blades and the direction of rotation of one or more rotor blades. For example, rotor blades on the top left and bottom right of the UAV (as 1 and 3 shown in FIG. 6) may be controlled to rotated in a clockwise direction in a first speed or in two different speeds, and the rotor blades on the top right and bottom left side of the UAV (as 2 and 4 in FIG. 6) may be controlled to rotated in a counter clockwise direction in a second speed or in two different speeds (when viewed from the top of the UAV), and the speed of each set of rotors on the same propulsion unit may be controlled so that the top-left side of the UAV (as 1 shown in FIG. 6) moves higher along the yaw axis (z axis in FIG. 1) than the other propulsion units.

The flip of the UAV may result in rotational movement, translational movement, horizontal movement, vertical movement or their combinations to the UAV. The UAV may be at a different or a same position in three dimensions after a flip. During the flip, the UAV may have translational movement, rotation movement, horizontal movement, vertical movement or their combinations.

The controller or terminal 1106 may include a user interface such as a keyboard, mouse, joystick, touchscreen, a microphone, an electronic display, or the like. Any user input can be used to interact with the controller, such as manually entered commands, voice control, gesture control, voice control, eye movement, or position control (for example, via a movement, location or tilt of the terminal).

Different type of actions of the user 410 may initiate the flip. A single action by the user may initiate the flip process. In some cases, the single action is the selection of a button or touchscreen of a terminal remote to the UAV. Alternatively, the single action may be the flip of a switch on a terminal remote to the UAV, a verbal command that is registered by a terminal remote to the UAV, a change in attitude of a terminal remote to the UAV, or any actions. Alternatively, a manual process with user-controlled motion parameters may initiate how the flip may occurs. Alternatively, a user may select from a pre-determined list of options to initiate different type of flip with different motion parameters. Alternatively, a user may directly move a joystick or the like to control correlated movements of the UAV and result in a flip.

The UAV communicates data with the controller or terminal 1106 via a communication channel 1108. Such communication via the channel may be one-way or two-way. Any channels of communication can be used, such as wired communication channels or wireless communication channels. For example, communication may use one or more of local area networks (LAN), wide area networks (WAN), infrared, radio, Wi-Fi, point-to-point (P2P) networks, telecommunication networks, cloud communication, Bluetooth and the like. Optionally, relay stations, such as towers, satellites, or mobile stations, can be used. Wireless communications can be proximity dependent or proximity independent. In some embodiments, line-of-sight may or may not be required for communications.

Figure 12:
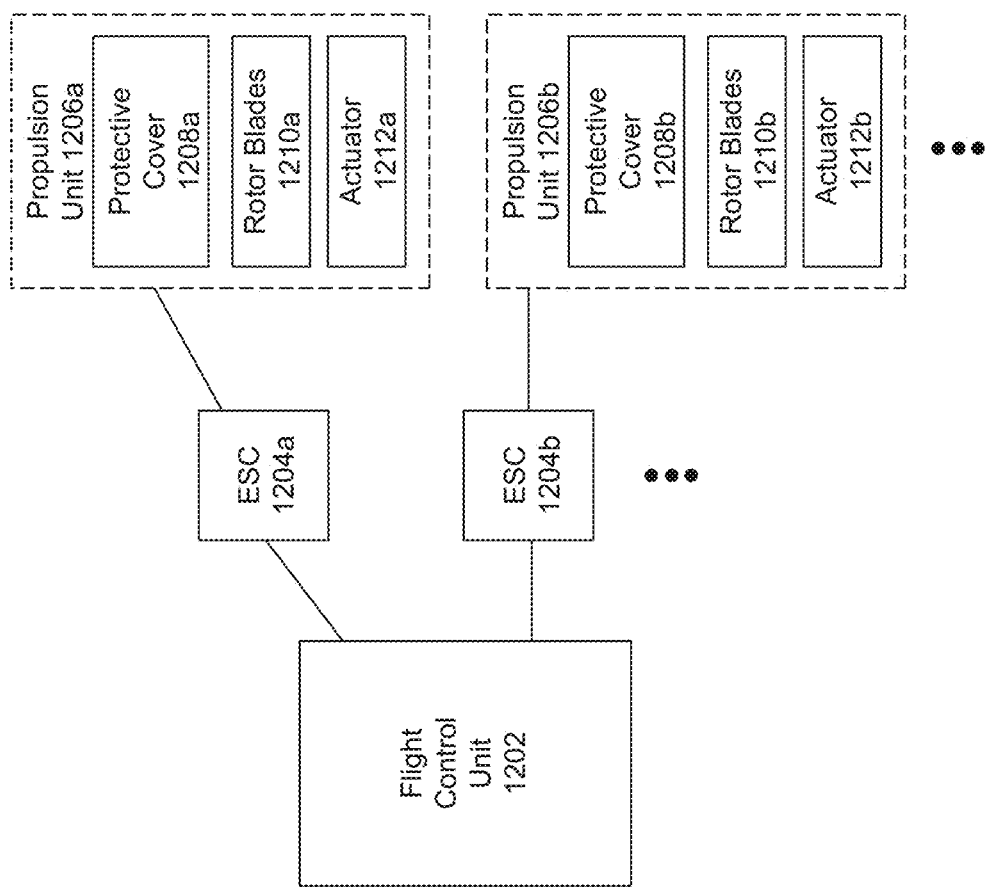
FIG. 12 illustrates a schematic view of a flight control system of a UAV that is capable of effecting a change in orientation of the UAV, in accordance with embodiments of the present disclosure.

There are advantages with user-controlled flip of the UAV. In some cases, when the camera only captures views from certain angles of the UAV, the user may flip the UAV and choose to flip the UAV to capture images that would otherwise not be able to get. In alternative cases, when the UAV is outside of the eyesight of the user, the user may choose to flip the UAV and enable the UAV to automatically return to the user with the flip and the correspondingly reversed flying route. As another example, when the UAV experiences some dysfunction with a protective cover at its bottom edge and may be unable to land properly in a current orientation, the user may choose to flip the UAV and uses the protective cover's top edge for protected landing after a flip. As another example, when the UAV may get trapped by external objects and cannot resume flying by its automatic controls, the user may initiate an auto-return function of the UAV so that the UAV may revert its route back to where it starts. FIG. 12 illustrates a schematic view of a flight control system of a UAV that is capable of effecting a change in orientation of the UAV, in accordance with embodiments of the present disclosure.

A UAV may include a flight control unit 1202 which delivers control command(s) to one or more electronic speed controls (ESCs) 1204a, 1204b. An ESC 1204a may interpret the control command(s) received from the flight control unit 502 and thereby control a propulsion unit 1206a, a protective cover 1208a, a plurality of rotor blades 1210a, and an actuator 1212a for the rotor blades 1210a. Additionally, the flight control unit may control communication to a remote controller, optional landing gear, and/or one or more sensors of the UAV.

The UAV disclosed herein may include one or more processors (e.g. located at the flight control unit or one or more ESCs), individually or collectively configured to generate a signal that causes the UAV to flip from a first orientation to a second orientation opposite the first orientation; and one or more propulsion units that effect the flip of the UAV from the first orientation to the second orientation in response to the signal.

A flight control unit 1202 may include one or more components that enable its control of the UAV and one or more elements therewithin. The flight control unit may include one or more selected from: a digital processing device, a processor, a digital filter, a data communication link, a power source, a computer memory, a database, an algorithm, an operation system, a computer program, an application, a software module, a non-transitory computer media, or the like. The flight control unit may be on-board the UAV in order to allow fast communication and efficient control of the UAV from the unit. A flight control unit may be located on one or more different locations including: the central body, the propulsion unit 1206a, 1206b, the rotors 1210a, 1210b, the protective cover 1208a, 1208b, and the structural support. Alternatively, the flight control unit may be off-board the UAV to reduce weight, reduce possible damages during UAV operation, and/or remove possible constraints to the flight control unit, such constraints may include but are not limited to the size, weight, power supply, and processing speed of the control unit.

The flight control unit may include one or more one or more processors configured to individually or collectively control direction of the first set of rotating components and the second set of rotating components of the one or more propulsion units. In some cases, the processor may be configured to generate a signal to control one or more propulsion units. In some cases, a signal from the one or more processors is configured to cause the UAV to change orientations between the first orientation and the second orientation.

A flight control unit 1202 may communicate with the one or more sensors, the controller, and/or terminal in two-way communication. A flight control unit 1202 may receive data from one or more sensors, process data from one or more sensors, store signal from one or more sensors, and/or generate control signal to control one or more propulsion units. Alternatively, a flight control unit may receive signal(s) from one or more controller or terminal, process signal from one or more controller or terminal, store signal from one or more controller or terminal, and/or generate control signal (s) to one or more propulsion units. A flight control unit may automatically generate a control signal to the ESC 1204a, 1204b based on data received from one or more sensors or one or more terminals. Alternatively, a flight control unit may deliver manual signal from a terminal or a controller to form a control signal to the rotors. In some cases, data processing at the flight control unit may include but may not be limited to: noise reduction, signal segmentation, filtering, sampling, algebraic operation of one or more signals, frequency analysis, thresholding, compression, decompression, encryption, decryption, signal transformation, or the like. A flight control unit may also receive data from one or more propulsion units, process data from one or more propulsion units, store data from one or more propulsion units, or transmit data to one or more sensors, controllers, and/or terminals. Such communication may a feed-back of the UAV operation.

The UAV may include an electronic speed control (ESC) unit 1204a, 1204b that communicates directly with the flight control unit 1202 as well as one or more propulsion units 1206a, 1206b, and element(s) therewithin. The ESC may or may not be part of the flight control unit. The ESC may or may not be physically located at or in close vicinity to the flight control unit. An ESC may be located on one or more different locations including: the central body, the propulsion unit 1206a, 1206b, the rotors 1210a, 1210b, the protective cover 1208a, 1208b, and the structural support. Alternatively, the ESC may be off-board the UAV to reduce weight, reduce possible damages during UAV operation, and/or remove possible constraints to the ESC, such constraints may include but are not limited to the size, weight, power supply, and processing speed of the control unit. The ESC may communicate with the one or more sensors, the controller, and/or terminal directly or indirectly (with an intermediator, e.g., with the flight control unit 1202). The communication from or to the ESC may be one-way or two-way. The communication may be one way from the flight control unit to the ESC then to one or more propulsion units and its element(s) therewithin. The communication may be two-way so that the speed at the one or more propulsion units and its element(s) therewithin may be detected by the ESC and then communicated to the flight control unit.

The ESC may include one or more one or more processors configured to individually or collectively control direction of the first set of rotating components and the second set of rotating components of the one or more propulsion units. In some cases, the processor may be configured to generate signal to control one or more propulsion units. In some cases, a signal from the one or more processors is configured to cause the UAV to change orientations between the first orientation and the second orientation. In some cases, the signal is provided to the one or more corresponding propulsion units by one or more ESC units, said ESC units configured to individually control speeds and/or directions of one or more corresponding rotating components of the one or more propulsion units. In some cases, the signal from the one or more ESC units is configured to cause the UAV to change orientations between the first orientation and the second orientation. In some cases, the one or more rotating components include rotor blades. In some cases, the first orientation is for the UAV to be upside down. In some cases, the second orientation is for the UAV to be right-side up.

The ESC 1204a, 1204b may translate a comprehensive signal from the flight control unit into separate speed control signals so that at least one element of at least one propulsion unit can be controlled by the ESC. The ESC or the flight control unit 1202 may use existing or current speed, position, orientation, voltage, current, and/or power data as input, future speed, position, orientation, voltage, current, and/or power data as output, and calculate the parameter(s) for element(s) of the propulsion unit that may change the input data into the output data of the UAV. The time duration to complete the speed control process may be another input for the ESC to consider. The ESC may include a feed-back system to control the speed of the propulsion units. As an example, if the current speed of rotor blades 1210a in one propulsion unit 1206a is 1000 rounds per minute (rpm) with an actuator power of 10, the ESC compares the future speed to 1000 rpm, if the future speed sent by the flight control unit is 3000 rpm, the ESC may increase the power level to 30. Alternatively, the ESC may gradually increase power and detects the rotor blade speed in real time, and then adjust power again accordingly based on the real-time rotor blades speed until it reaches the speed goal set by the flight control unit. Alternatively, the ESC may search pre-existing look-up database or the like regarding speed-power relationship and locate the exact power using the desired speed.

The ESC 1204a, 1204b may be any type of ESCs that may be used for UAVs. The ESC may serve similar purpose as a throttle servo of a glow powered airplane. The ESC may be electrically and/or electronically connected to a power source (e.g. a battery), the flight control unit 1202, and the actuator 1212a, 1212b. The ESC may include an electronic circuit to vary a speed, a direction and possibly also to act as a dynamic brake of an actuator 1212a, 1212b, thereby controls rotation of the rotor blades 1210a, 1210b. The ESC may contain a microcontroller interpreting the input signal from the flight control unit 1202 and appropriately controlling the actuator using a built-in or customized program. The ESC may have an update rate of about 0.001 Hz to about 5000 Hz. The ESC may send the output control signal to rotors at constant or variable update rate. The output signal that the ESC sends to the motor(s) may be alternating current signal with specific alternating frequency and voltage level(s). The output signal may also have different phases. In some cases, the ESC may accepts a 50 Hz input signal from the flight control unit 1202 or servo whose pulse width varies from 1 millisecond (ms) to 2 ms. When supplied with a 1 ms width pulse at 50 Hz, the ESC may responds by turning off the actuator attached to its output. A 1.5 ms pulse-width input signal may drive the actuator at approximately half-speed. When presented with 2.0 ms input signal, the motor may run at full speed. The input signal that the ESC receives from the flight control unit 1202 may be alternating current signal with specific voltage level(s). The output signal may also have different phases. Alternatively, the input signal may be any electrical or electronic signals that may be translated at the ESC to output waveform signals.

Each ESC 1204a, 1204b may be positioned at different locations of the UAV. In some embodiments, the ESC may be located at the central body, at the protective cover 1208a, 1208b, at the optional arm extending from the central body and supporting the propulsion units 1206a, 1206b, at the propulsion units, at the actuator 1212a, 1212b, at optional landing gear, or any other locations of the UAV. Each propulsion unit 1206a, 1206b may include an arbitrary number of rotor blades 1210a, 1210b In some cases, each propulsion unit includes an even number of rotor blades. In some cases, each propulsion unit includes at least 2, 4, or 6 rotor blades. Each rotor blade of the same propulsion unit is attached to the actuator 1212a, directly or indirectly to a same actuator at its proximal end (e.g. as shown in FIG. 1). And the total number of rotor blades distributes evenly along a circular area. As an example, 4 rotor blades may be 90 degrees apart from its neighboring rotor blades and are evenly distributed. The distal end of each rotor blades extends outwardly. Each rotor blade has a top surface substantially facing upward in the UAV's initial taking-off orientation (with or without a tilt angle), and a bottom surface substantially face downward (with or without a tilt angle) when the top part of the UAV is facing upward. There may be a tilt angle between a horizontal plane and the top or the bottom surface, when the UAV is substantially in a horizontal plane.

The UAV may include one or more protective covers 1208a, 1208b that prevent the one or more propulsion units from directly contacting an external object. The UAV may include at least a protective cover 1208a, 1208b for one propulsion unit 1206a, 1206b. In some cases, a height of the one or more protective covers is greater than a height of a central body of the UAV. In some cases, a height of the one or more protective covers is greater than a height of the one or more propulsion units. In some cases, each of the one or more protective covers 1208a, 1208b . . . forms a tunnel around a corresponding propulsion unit of the one or more propulsion units. In some cases, the protective cover protects the rest of the elements of the propulsion unit from damages or undesired impact from external sources when the UAV is flying, landing, taking off, and/or changing directions. The protective cover may have any three dimensional geometrical shape that includes a tunnel around a corresponding propulsion unit of the one or more propulsion units, as can be seen as 106 in FIG. 1. In some cases, each protective cover comprises a sleeve in which a propulsion unit is disposed. In some cases, the one or more protective covers permit the one or more rotating components of the one or more propulsion units to rotate in the first direction or the second direction when the UAV is on an underlying surface. The rotating component may include a rotor (or rotor blades), a set of rotor(s), and/or a motor actuating the rotor(s). The tunnel or sleeve is not covered at its top and its bottom but covered and supported along its longitudinal direction from its top to the bottom. The other elements of the propulsion unit may be enclosed in the tunnel/sleeve of the protective cover. The other elements may be also located toward the center of the chamber along the longitudinal direction in order to provide optimal protection, support, and/or weight distribution of the propulsion unit. The protective cover preferably has a cylindrical shape. The protective cover may have other three-dimensional shapes. Examples include a cubic, a cuboid, a foot-ball shape, a spindle shape, an hour-glass shape, an ovoid, or the like. The protective may have one or both of its top and bottom faces not covered completely in order to allow proper venting and air flow from within the protective cover to outside of the protective cover.

Each propulsion unit 1206a, 1206b may include an actuator 1212a, 1212b for driving rotation of the rotor blades. The actuator may be coupled to the one or more rotor blades with aid of a shaft. Rotation of the actuator may cause rotation of the shaft, which may in turn cause rotation of the rotor blades. Any description of a shaft may also apply to multiple shafts that may be driven by the same actuator. The actuator may be a motor. Any driving mechanism can be used for the actuator, such as a DC motor (as, brushed or brushless), AC motor, stepper motor, servo motor, and the like. The movement can be actuated by any actuation mechanism, such as an engine or a motor. The UAV can include one or more engines, motors, wheels, axles, magnets, rotors, propellers, blades, nozzles, or any combination thereof. Further, different actuators may work dependently or independently with each other to actuate individual propulsion units for different rotational movements. In some embodiments, propulsion unit 1206a may be actuated to have an opposite rotational direction and a different rotational speed as propulsion unit 1206b. Such differences allowed by the actuator(s) of the UAV may greatly facilitate the UAV in its proper function especially its change of flight orientations.

Each propulsion unit 1206a, 1206b may include a supporting structure. The supporting structure prevents at least a portion of the protective cover from collapsing. The supporting structure contacts the protective cover at its inner surface at one end, and contacts the actuator, the rotor blade(s), a rotating shaft, and/or other elements within the protective cover. The supporting structure may be located closer to the center than to both edges of the protective cover in the longitudinal direction of the cover. In some embodiments, at least one ESC is included in one propulsion unit. An ESC may be located close to the center of the protective cover longitudinally without obstructing the rotation of the rotor blades. An ESC may be attached to each rotor blade close to or in close vicinity to the proximal end of the blades. In some cases, an ESC is attached to or in close vicinity to the actuator, or the rotating shaft. In some cases, at least two ESC is included, one attached or in close vicinity to a rotor blade(s), the other attached to or in close vicinity to an actuator or a rotating shaft.

The UAV may change orientation, speed, or flying direction by control of rotational speed and/or direction of one or more propulsion units 1206a, 1206b. The UAV may change orientation, speed, or flying direction by control of rotational speed and/or direction of one or more rotor blades. With control of each propulsion unit separately or together, the flipping type, and the flipping velocity of the UAV may be controlled. For example, for each propulsion unit, the rotor speed, and the rotor direction may be controlled individually. For a UAV with four propulsion units, eight individual parameters may be controlled independently or in a combination of any integer between two and eight, resulting in a great variety of possible combination of rotating speed and directions in one to four propulsion units. By using these different combinations, the orientation, speed, flying direction, acceleration, lift, or other properties of the UAV as mentioned above may be controlled. As an example, in detection of an obstacle to the left side of the UAV, the UAV may increase the rotational speed of two propulsion units on the left-side of the UAV so that the left side may be lifted further up than the right side to avoid the obstacle. As another example, when the UAV hits an obstacle and flipped accidentally, the UAV may automatically revert the rotation direction of all propulsion units and increase the rotational speed of propulsion units on the left side so that it is higher than the speed of propulsion units on the right, the left side of the UAV lift up fast enough and initiate a 180-degree flip of the entire UAV. The rotational speed and direction of each propulsion unit may be adjusted during the flip and after the UAV is flipped.

The flipping velocity may have a constant magnitude with a varying direction. The flipping velocity may be varying in both its magnitude and direction. The magnitude of flipping velocity may include any shape of waveform that starts from zero at the onset of flipping and ends at zero at the end of flipping.

Figure 13:
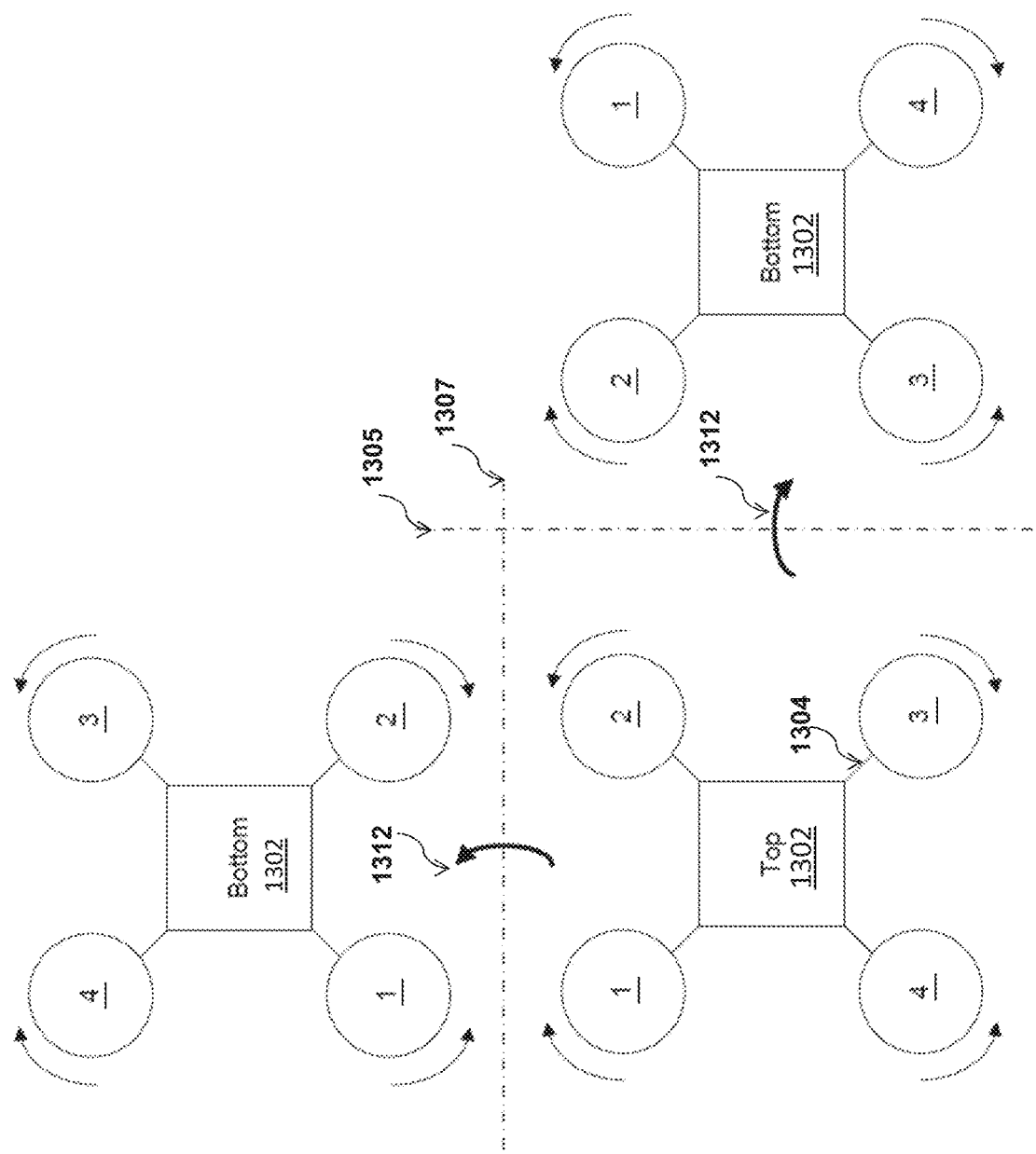
FIG. 13 illustrates a schematic view of the rotation directions of propulsion units of a UAV when the UAV is in different orientations, in accordance with embodiments of the present disclosure.

FIG. 13 illustrates a schematic view of the rotation directions of propulsion units of a UAV when the UAV is in different orientations, in accordance with embodiments of the present disclosure.

The UAV may have four propulsion units 1, 2, 3, and 4 extending from the central body 1302. When viewed from the top, a first propulsion unit 1 may extend from the top-left of the central body, a second propulsion unit 2 may extend from the top-right of the central body, a third propulsion unit 3 may extend from the bottom right of central body, and a fourth propulsion unit 4 may extend from the bottom left of the central body. Two propulsion unit 1 and 3 may rotate clockwise while the other two propulsion units 2 and 4 may rotate counter clockwise when the UAV is in the right-side orientation (i.e., the top side of the UAV is facing upwards). When the UAV is flipped 1312 about a flipping axis 1305 to be in an upside down orientation (bottom right in FIG. 13), the bottom of the UAV may face upward, and the locations of the propulsion units may be mirrored about the flipping axis 1305. In order for the UAV to take-off or fly when it is in the upside down orientation, the propulsion units 1 and 3 may rotate counter clockwise while propulsion units 2 and 4 may rotate in an opposite direction clockwise, as shown in the bottom right of FIG. 13. Conversely, when the UAV is flipped about another flipping axis 1307 to be in another upside down orientation (top left in FIG. 13), the bottom of the UAV may face upward, and the locations of the propulsion units may be mirrored about the flipping axis 1307. In order for the UAV to take-off or fly when it is in the upside down orientation, propulsion units 1 and 3 may rotate counter clockwise while propulsion units 2 and 4 may rotate in an opposite direction clockwise, as shown in the top left of FIG. 13.

In some embodiments, the UAV may have at least four propulsion units 1, 2, 3, and 4. Similar to a quadrotor helicopter, or quadcopter, the four propulsion units may use two sets of rotor blades. The rotor blades located in propulsion units along the same diagonal axis of the UAV may be in the same set (e.g. 1 and 3, or 2 and 4). The rotating components may be sets of rotor blades. The first set of rotating components (e.g. 1 and 3) may be configured to rotate in a first direction and the second set of rotating components (e.g., 2 and 4) may be configured to rotate in a second direction when the UAV is in a first orientation. Conversely, the first set of rotating components may be configured to rotate in the second direction and the second set of rotating components may be configured to rotate in the first direction when the UAV is in a second orientation opposite the first orientation (left panel and right panel). As an example, blades of the top left 1 and bottom right 3 propulsion units may rotate clockwise while blades the top right 2 and bottom left 4 propulsion units may rotate counterclockwise when viewed from the top of the UAV in the right-side up orientation. When the UAV changes flight orientation, both sets may change rotating direction such that the set initially rotating clockwise may rotate counterclockwise and the set initially rotating counter clockwise may rotate clockwise. In some cases, the rotor blades may have a fixed pitch. Two propulsion units along the diagonal axis of the UAV (top-right to bottom-left or top-left to bottom-right) may rotate in the same direction at the same speed or at different speeds. Two propulsion units not on the same diagonal axis of the UAV (top-right to bottom-left or top-left to bottom-right) may rotate in different directions at the same speed or at different speeds. By changing the speed of the motor(s) actuating individual set of rotor blades, and thus the rotating speed of each set of rotor blades, a thrust can be generated to propel the UAV in three spatial dimensions, or to generate a desired torque (or turning force) to change the orientation (attitude) of the UAV. For example, a height of a UAV may be controlled by adjusting the amount of power to all four motors. Turning left or right or changing height may be achieved by decreasing or increasing the speed of individual rotors.

When the UAV is in a different orientation opposite to the right side up orientation, the same rotating direction of the propulsion unit may fail to generate lift for the UAV. However, by reversing the rotating direction, a lift can be generated for the UAV when it is in the different flight orientation. The reversed direction may be counter clockwise for one or more propulsion units, and clockwise for the remaining propulsion units of the UAV. Alternatively, the UAV may obtain sufficient lift using the rotating direction shown in the bottom right of FIG. 13 in an upside down orientation. When the UAV is an opposite flight orientation, and if there are no changes to the rotating direction, the UAV may lose its lift and experience a downward drag as well as gravity. In order to provide lift to the UAV, all the rotor blades may reverse their rotating directions, for example as shown in FIG. 13.

Each set of rotor blade of 1, 2, 3, or 4 may include a pitch. The pitch of the same set of rotor blades along the same diagonal axis of the UAV may be substantially identical. The pitch of a rotor blade may remain constant or vary over time in order to adjust the thrust or torque of the UAV. The pitch of a rotor blade may be adjusted over time independently via the ESC, the flight control unit, a remote control, a terminal, or a combination thereof. As an example, the UAV may automatically or by external control vary pitch in flight, to give optimum thrust over the maximum amount of the UAV's speed range during taking off, landing, flying, and hovering. As another example, low pitch may be used to yield good low speed acceleration and climb rate during take-off while high pitch optimizes high speed performance during flying.

The rotation of rotor blades may be within one or more planes that may be substantially parallel to the top surface and/or bottom surface of the central body 602 of the UAV. The rotation of rotor blades may be within one or more planes that may be substantially vertical to the longitudinal axis of the protective cover or the z axis as in FIG. 1, and/or substantially parallel to the top edge and/or bottom edge of the protective cover. The rotation axis of rotor blades may be vertical to a horizontal plane (x-y plane in FIG. 1). The rotation axis of rotor blades may be vertical to one or more arms 1304 extending from central body 602 and supporting the propulsion units 1, 2, 3, 4.

The change in rotational parameters of one or more rotator blades may cause the flip of the UAV. The change in rotational parameters may include one or more selected from: an angle of attack of a rotor blade, a pitch of a rotor blade, a rotating speed of a blade, a rotating direction of a rotor blade, or the like. The change of in rotational parameters of one or more rotator blades may result in change of lift, thrust, torque, flip, or a combination thereof. As an example, increasing rotating speed and/or changing pitch of one or more rotor blades on the right side of the UAV may increase generate a torque and/or increased lift on the right which may cause a horizontally balanced UAV to be right side up, top-right side up, or bottom-right side up, and then UAV may flip about 180 degrees to be up-side down.

The UAV may flip about a flipping axis 1305, 1307 that is parallel to a roll axis or pitch axis of the UAV. The flipping axis may be located away from the UAV. The distance from the UAV to the flipping axis may be substantially the same before or after the flip 1312. As an example, propulsion unit 1 may have a similar distance to the flipping axis before or after the flip.

Figure 14:
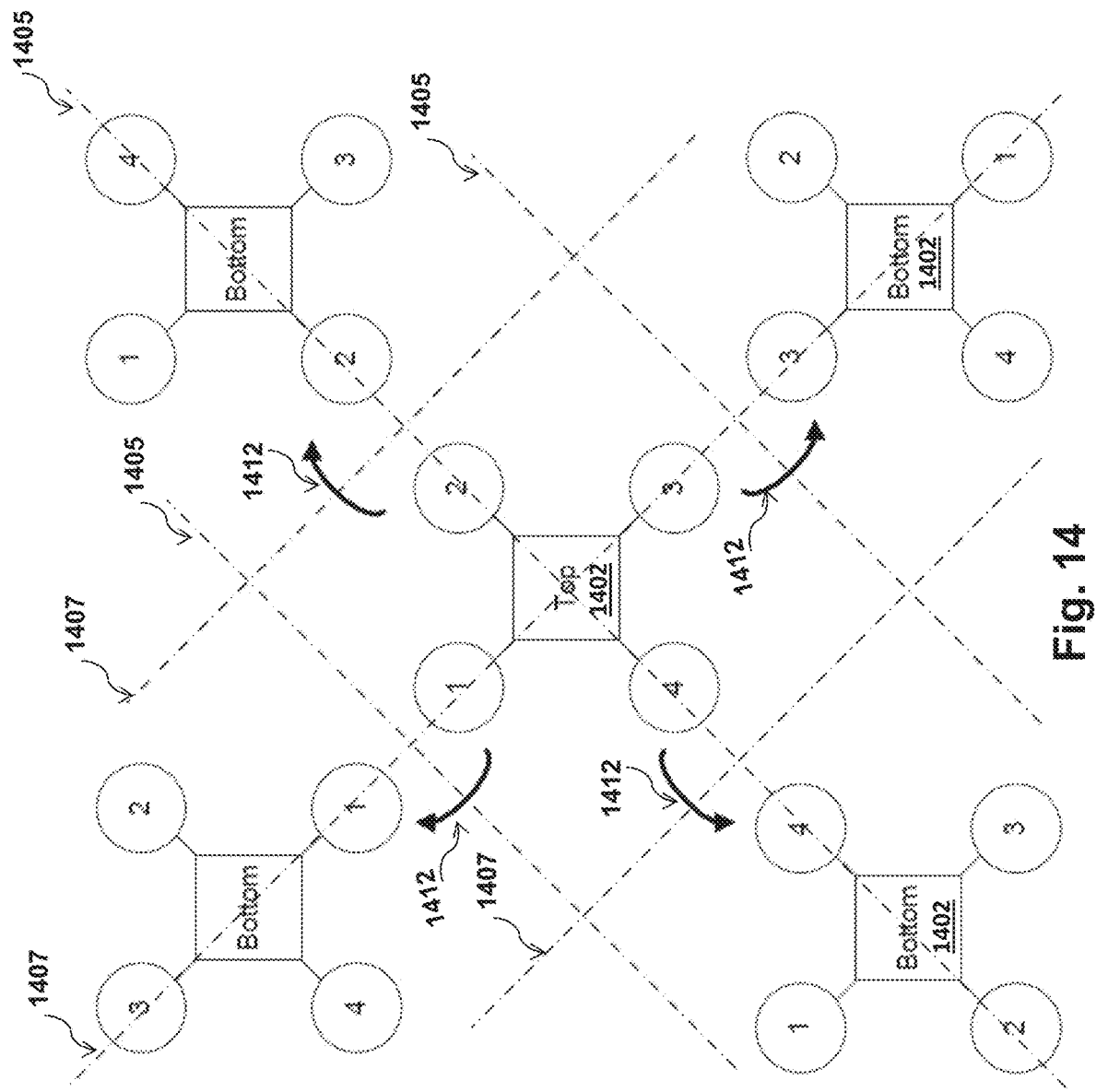
FIG. 14 illustrates a schematic view of a UAV capable of flipping along lines that are diagonal to a central body of the UAV, in accordance with embodiments of the present disclosure.

FIG. 14 illustrates a schematic view of a UAV capable of flipping along lines that are diagonal to a central body of the UAV, in accordance with embodiments of the present disclosure.

The embodiment in FIG. 14 may be similar to the embodiment in FIG. 13 except for the following differences. In FIG. 14, the flipping axis 1405, 1407 may be along a diagonal connecting the same set of propulsion units of the UAV). The flipping axis 1407 may extend between the same set of propulsion units 1 and 3; and the flipping axis 1405 may extend between the same set of propulsion units 2 and 4. The flipping axis may be within a plane parallel to the x-y plane as shown in FIG. 1. The flipping axis may be about 45 degrees to the roll and pitch axes of the UAV. The distance from the UAV to the flipping axis 1405, 1407 may be substantially the same before or after the flip 1412. As an example, the geometrical center of the central body may have a similar distance to the flipping axis before or after the flip 1412. The flipping axis may be overlapping partially with the UAV.

Figure 15:
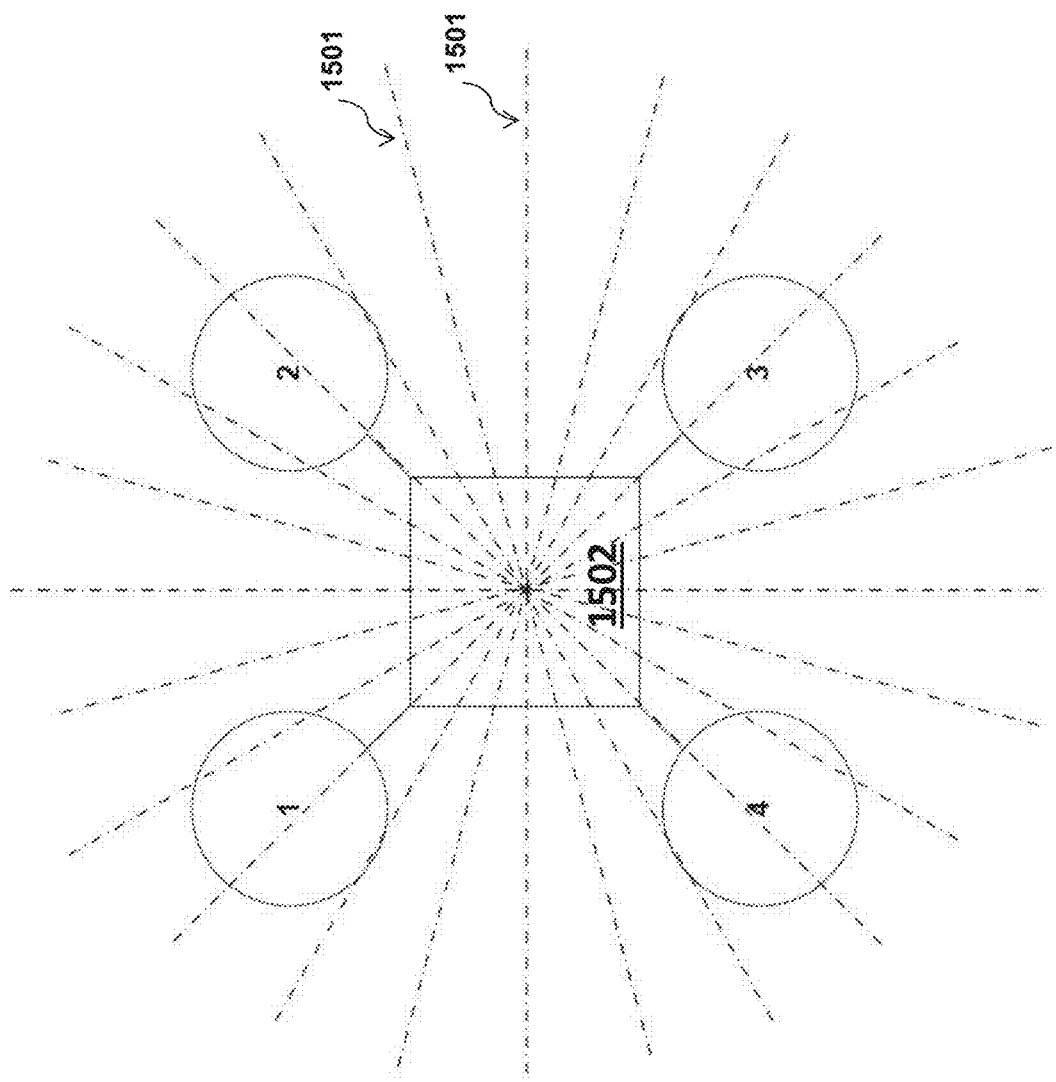
FIG. 15 illustrates a schematic view of a UAV capable of flipping about multiple axes defined with respect to a central body of the UAV, in accordance with embodiments of the present disclosure.

FIG. 15 illustrates a schematic view of a UAV capable of flipping about multiple axes defined with respect to a central body of the UAV, in accordance with embodiments of the present disclosure.

The embodiment in FIG. 15 may be similar to the embodiment in FIG. 13 except for the following differences. In FIG. 15, the flipping axis 1501 may be within a plane parallel to the x-y plane as shown in FIG. 1. The flipping axis may have any arbitrary angle to the pitch, roll, or yaw axes of the UAV. The angle may be any angle in the range of about 0 degrees to about 90 degrees. The flipping axis may intersect a central body of the UAV. Alternatively, the flipping axis may offset from the central body of the UAV. Accordingly, a UAV can be configured to flip about any axis defined in a three-dimensional space, by adjusting the speeds and rotational directions of the rotors in the propulsion units.

FIG. 16 provides an illustration of various components of a UAV, in accordance with embodiments of the present disclosure. The UAV may have a central body 1602 that has a lower height than the protective covers 1606. The height of the central body $h_b$ may be less than the height of one or more protective cover $h_{pc}$. When the UAV lands in an orientation (e.g. the right side up orientation) 1600b, the protective cover may touch the landing surface using its second portion (e.g., bottom edges), and the central body 1702 may be located such that it does not touch the landing surface when the UAV lands in any orientation. The width 1604 of the protective cover 1606 may be sufficient to include one or more rotor blades 1610 therewithin, and allow them to rotate without touching the longitudinal wall of the protective cover. The rotor blades 1610 may have a height $h_{rb}$ that is smaller than the height of one or more protective cover, $h_{pc}$, and the rotor blades may be located sufficiently to the center of the protective cover 1606 along its longitudinal direction. The rotor blades 1610 may be positioned such that they do not touch the landing surface or the protective cover when the UAV lands in any orientation. The propulsion unit 1604 may be connected to a distal end of an arm extending from the central body 1602.

The central body 1602 may have any three-dimensional arbitrary shape that provides sufficient space to house a payload, a power source, a sensor, and/or the like therewithin. The central body may have any arbitrary shape that provides supports to one or more propulsion units or arms attached thereon. Examples of the central body may be a cubic, a cuboid, a foot-ball shape, a spindle shape, an hour-glass shape, an ovoid, a cylinder or the like. The central body may include interfaces on its surface that allows transformation of one or more arms or one or more propulsion units between a folded/compact configuration and an extended/flying configuration. In some embodiments, the central body has a shape and a density that enable a predetermined distribution of weight of the entire UAV. The central body may have an outer surface that is protected by one or more protective covers. The central body may have an outer surface that does not contact any external subjects that the one or more protective covers contacts.

In some cases, each propulsion unit is directly attached to the outer surface of the central body 1602. Such attachment may be through attachment of the protective cover 1606 (e.g. as shown in FIG. 1). Alternatively, each propulsion unit may be attached to the central body through an arm 1612 extending from the outer surface of the central body. The proximal end of the arm 1612 may attach to the outer surface of the central body 1602 via an optional interface. The distal end of the arm may contact the support for the propulsion unit, protective cover 1606, the hub, the actuator, or their combination via another optional interface.

The UAV may include at least one protective cover 1606 for each propulsion unit. The UAV may include at least one protective cover that protects two or more propulsion units. The protective cover protects the elements of the propulsion unit from damages or undesired impact from external sources when the UAV is flying, landing, taking off, and/or changing directions. The protective cover may have any three dimensional geometrical shape that includes a tunnel or sleeve in which a corresponding propulsion unit is disposed, as can be seen as 106 in FIG. 1. The tunnel may not be covered at its top and its bottom but covered and supported along its longitudinal direction from top to bottom. The elements of the propulsion unit (e.g. rotor blades 1610) may be enclosed in the tunnel of the protective cover. The elements may be also located toward the center of the chamber along the longitudinal direction in order to provide optimal protection, support, and weight balance and/or weight distribution of the propulsion unit. The protective cover preferably has a cylindrical shape. The protective cover may have other three-dimensional shapes. Examples include a cubic, a cuboid, a foot-ball shape, a spindle shape, an hour-glass shape, an ovoid, a tunnel, a tube, a sleeve, or the like. The protective may have one or both of its top and bottom faces not covered completely in order to allow proper venting and air flow from within the protective cover to outside environment. The wall of the protective cover may be solid. Alternatively, the wall of the protective cover may be a frame with any various frame patterns that may provide sufficient support to the UAV. The frame protective covers may be used to allow less-limited access to air as compared to solid covers. The frame protective cover may add less weight to the UAV. The solid protective covers may provide more comprehensive protection to the UAV. The solid or frame protective covers may be selected based on different usage of UAV and different types of environment the UAV mainly flies in. The protective covers may have a shape that is asymmetric from its top edges to bottom edges so that the protective cover looks different when it is up-side down. The protective covers may have a shape that is symmetric with the plane of symmetry at the central cross-section of the protective cover along the longitudinal direction. When the UAV flips 180 degrees and changes it orientation, the protective cover may look the same if it is symmetric. The protective cover may be shaped or configured to facilitate same or different thrust in different orientations. As an example, the tunnel or chamber of the protective cover may increase the thrust produced by the corresponding propulsion unit therewithin by at least about 5%, about 10%, about 15%, or about 20% relative to the thrust produced without the tunnel. Such advantages of thrust facilitation may be for at least one, two, or more flight orientations of the UAV.

In some cases, each protective cover may include a first portion 1606a and a second portion 1606b. In some cases, the first portion of the protective cover(s) is located above the body 1602 in a direction of lift 1601 generated by the one or more propulsion units when the UAV is in the second orientation 1600b (e.g., the right side up orientation). In some cases, the second portion of the protective cover(s) is located above the body in a direction of lift (e.g. toward the underlying surface) generated by the one or more propulsion units when the UAV is in the first orientation (e.g. the upside down orientation). In some cases, the first portion and the second portion of the protective cover, regardless of the flight orientation of the UAV, may refer to the top and the bottom portions of the protective cover, respectively, when the UAV is in a right-side up orientation positioned along a horizontal plane (e.g., the orientation the UAV initially takes off in).

The protective cover 1606 may include at least a deformable material, at least a stiff material, and/or at least a non-deformable material. The protective cover may include at least a material that has an elastic modulus of no greater than about 1 gigapascal (GPa). The protective cover may include at least a material that has an elastic modulus of between about 1 to about 10 GPa. The protective cover may include at least a material that has an elastic modulus of no less than about 10 GPa, about 20 GPa, about 30 GPa, about 40 GPa, about 50 GPa, about 60 GPa, about 70 GPa, about 80 GPa, about 90 GPa, or about 100 GPa. The protective cover may include at least a material with a modulus of resilience of less than about 1 pound per square inch (PSi). The protective cover may include at least a material with a modulus of resilience of less than about 5 PSi. The protective cover may include at least a material with a modulus of resilience of greater than about 5 PSi. The protective cover may include at least a material with a modulus of resilience of greater than about 50 PSi. The protective cover may include at least a material with a modulus of resilience of greater than about 200 PSi. The protective cover may include at least a material with a modulus of resilience of greater than about 500 PSi. The protective cover may include at least a material with a modulus of resilience of greater than about 2000 PSi.

The protective cover 1606 may have a height of about 2 cm to about 60 cm. The central body may have a height of about 1 cm to about 45 cm. The rotor blades may have a height of about 1 cm of about 40 cm. The rotor blades may have a length of about 2 cm to about 35 cm. The central body may have a smallest dimension that is about 1 cm to about 40 cm.

Each propulsion unit may include an arbitrary number of rotor blades 1610. In some cases, each propulsion unit includes an even number of rotor blades. In some cases, each propulsion unit includes at least 2, 4, or 6 rotor blades. Each rotor blade of the same propulsion unit may be attached to the actuator directly or indirectly to a same actuator at its proximal end. And the total number of rotor blades of each propulsion unit may be separated evenly, and the gap between each two adjacent rotor blades may be a substantially identical fan shape. As an example, 4 rotor blades may be 90 degrees apart from its neighboring rotor blades and may be evenly distributed. The distal end of each rotor blade extends outwardly. The proximal ends of each rotor blade may be rotatably connected to an actuator or a rotating shaft. Each rotor blade has a top surface substantially facing upward in the UAV's initial taking-off orientation (with or without a tilt angle), and a bottom surface substantially face downward (with or without a tilt angle) when the top part of the UAV is facing upward. There may be a tilt angle between a horizontal plane and the top or the bottom surface, when the UAV is substantially in a horizontal plane. The top and bottom surfaces of each rotor blades may be sufficiently flat. The top and bottom surfaces of each rotor blades may not be sufficiently flat that it may have a convex, a grove, a depression, a concavity, a protruding structure, a rib, or the like.

Each propulsion unit may include at least a protective cover 1606. The protective cover may protect the elements of the propulsion unit within the protective cover from damages or undesired impact from external sources when the UAV is flying, landing, taking off, and/or changing directions. Such elements of the propulsion unit may include all the rotor blades, all the supporting structures, all actuators, all sensors, the rotating shaft, all ESCs, all flight control units therewithin. In addition, the protective cover may also protect the central body 1602 and elements located on or within the central body from damages or undesired impact from external sources when the UAV is flying, landing, taking off, and/or changing directions. The protective cover also protects the optional arms 1612 of the UAV. The height $h_{pc}$ of one or more protective covers may be greater than the height of the central body $h_b$, and the central body may be positioned around the center of height $h_{pc}$ of the protective cover. Similarly, the height $h_{pc}$ of one or more protective covers may be greater than the height of the rotor blades $h_{rc}$, and the rotor blades may be positioned around the center of height $h_{pc}$ of the protective cover. Similarly the height $h_{pc}$ of one or more protective covers may be greater than the height of the propulsion unit, which may be smaller or equal to the total height of the rotor blades and the motors. Thus, the central body may be suspended above an underlying surface and protected from touching a landing surface or external objects when the UAV is landing or crashing to a landing surface in any orientation. The central body may be also suspended in the front-rear direction and/or left-right direction of the UAV, so that when the UAV lands with its left, right, front, or rear side down, the central body may be free of contact with the landing surface. In some cases, the one or more protective covers serve as landing gears for the UAV. In some cases, the one or more protective covers serve as landing gears for the UAV in a first orientation, in a second orientation, or in any other flight orientations. As examples, the top edges and/or the bottom edges of the protective cover may serve as landing stand or part of landing gear so that it touches a landing surface and allow the other elements remain suspended from the underlying surface. The protective cover may provide advantageous to different scenarios of UAV operation as it protects the rotor blades as well as the central body. In some instances, solid protective covers protects rotor blades from contacting tree branches or bushes when the UAV flies, thus prevent the rotor blades from trapping, stopping or even breaking by the tree branches or bushes. In other instances, when the UAV crash lands in an unpredictable orientation, (first left-side down then lands tilted on a uneven surface), various portions of the protective cover may touch the landing surface (the outer surface first then the bottom edge), and provide support for the entire UAV, and protect the central body from hitting the landing surface or any external objects on the landing surface. Thus, protects the central body and elements thereon and/or therewithin from damages or undesired impact. The portion of the protective cover contacting a landing surface may be the top edge, the bottom edge, and/or the longitudinal wall of the protective cover. In some instances, a UAV flips under a strong wind and drops to an uneven ground upside down. The top edge of the protective cover lands on the ground and protect the suspended central body.

FIG. 17 illustrates a movable object 1700 including a carrier 1702 and a payload 1704, in accordance with embodiments. Although the movable object 1700 is depicted as an aircraft, this depiction is not intended to be limiting, and any type of movable object can be used, as previously described herein. One of skill in the art would appreciate that any of the embodiments described herein in the context of aircraft systems can be applied to any movable object (e.g., an UAV). In some instances, the payload 1704 may be provided on the movable object 1700 without requiring the carrier 1702. The movable object 1700 may include propulsion mechanisms 1706, a sensing system 1708, and a communication system 1710.

The propulsion mechanisms 1706 can include one or more of rotors, propellers, blades, engines, motors, wheels, axles, magnets, or nozzles, as previously described. For example, the propulsion mechanisms 1706 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1706 can be mounted on the movable object 1700 using any means, such as a support element (e.g., a drive shaft) as described elsewhere herein. The propulsion mechanisms 1706 can be mounted on any portion of the movable object 1700, such on the top, bottom, front, back, sides, or suitable combinations thereof.

In some embodiments, the propulsion mechanisms 1706 can enable the movable object 1700 to take off vertically from a surface or land vertically on a surface without requiring any horizontal movement of the movable object 1700 (e.g., without traveling down a runway). Optionally, the propulsion mechanisms 1706 can be operable to permit the movable object 1700 to hover in the air at a specified position and/or orientation. One or more of the propulsion mechanisms 1700 may be controlled independently of the other propulsion mechanisms. Alternatively, the propulsion mechanisms 1700 can be configured to be controlled simultaneously. For example, the movable object 1700 can have multiple horizontally oriented rotors that can provide lift and/or thrust to the movable object. The multiple horizontally oriented rotors can be actuated to provide vertical takeoff, vertical landing, and hovering capabilities to the movable object 1700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1700 (e.g., with respect to up to three degrees of translation and up to three degrees of rotation).

The sensing system 1708 can include one or more sensors that may sense the spatial disposition, velocity, and/or acceleration of the movable object 1700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1708 can be used to control the spatial disposition, velocity, and/or orientation of the movable object 1700 (e.g., using a suitable processing unit and/or control module, as described below). Alternatively, the sensing system 1708 can be used to provide data regarding the environment surrounding the movable object, such as weather conditions, proximity to potential obstacles, location of geographical features, location of manmade structures, and the like.

The communication system 1710 enables communication with terminal 1712 having a communication system 1714 via wireless signals 1716. The communication systems 1710, 1714 may include any number of transmitters, receivers, and/or transceivers suitable for wireless communication. The communication may be one-way communication, such that data can be transmitted in only one direction. For example, one-way communication may involve only the movable object 1700 transmitting data to the terminal 1712, or vice-versa. The data may be transmitted from one or more transmitters of the communication system 1710 to one or more receivers of the communication system 1712, or vice-versa. Alternatively, the communication may be two-way communication, such that data can be transmitted in both directions between the movable object 1700 and the terminal 1712. The two-way communication can involve transmitting data from one or more transmitters of the communication system to one or more receivers of the communication system 1714, and vice-versa.

In some embodiments, the terminal 1712 can provide control data to one or more of the movable object 1700, carrier 1702, and payload 1704 and receive information from one or more of the movable object 1700, carrier 1702, and payload 1704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1706), or a movement of the payload with respect to the movable object (e.g., via control of the carrier 1702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1708 or of the payload 1704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1712 can be configured to control a state of one or more of the movable object 1700, carrier 1702, or payload 1704. Alternatively or in combination, the carrier 1702 and payload 1704 can also each include a communication module configured to communicate with terminal 1712, such that the terminal can communicate with and control each of the movable object 1700, carrier 1702, and payload 1704 independently.

In some embodiments, the movable object 1700 can be configured to communicate with another remote device in addition to the terminal 1712, or instead of the terminal 1712. The terminal 1712 may also be configured to communicate with another remote device as well as the movable object 1700. For example, the movable object 1700 and/or terminal 1712 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1700, receive data from the movable object 1700, transmit data to the terminal 1712, and/or receive data from the terminal 1712. Optionally, the remote device can be connected to the Internet or other telecommunications network, such that data received from the movable object 1700 and/or terminal 1712 can be uploaded to a website or server.

While preferred embodiments of the present disclosure have been shown and described herein, it will be obvious to those skilled in the art that such embodiments are provided by way of example only. Numerous variations, changes, and substitutions will now occur to those skilled in the art without departing from the present disclosure. It should be understood that various alternatives to the embodiments of the present disclosure described herein may be employed in practicing the present disclosure. It is intended that the following claims define the scope of the present disclosure and that methods and structures within the scope of these claims and their equivalents be covered thereby.

The invention claimed is:

1. A method of operating an unmanned aerial vehicle (UAV), said method comprising:
    providing a signal to control one or more corresponding propulsion units, thereby controlling directions of rotation of a first set of rotating components and a second set of rotating components of the one or more propulsion units, wherein the first set of rotating components are configured to rotate in a first direction and the second set of rotating components are configured to rotate in a second direction when the UAV is in a first orientation, the first set of rotating components are configured to rotate in the second direction and the second set of rotating components are configured to rotate in the first direction when the UAV is in a second orientation opposite the first orientation, and providing the signal to control the one or more corresponding propulsion unit includes providing the signal to effect a flip of the UAV between the first orientation and the second orientation in response to determining that the flip is needed based on a current orientation of the UAV and a landing surface; and
    protecting the one or more propulsion units with one or more protective covers that prevent the propulsion units from directly contacting an external object.

2. The method of claim 1 further comprising: controlling the directions of the first and second sets of rotating components of the one or more propulsion units to generate a lift for the UAV.

3. The method of claim 2 further comprising: generating the lift when the UAV is taking off from an underlying surface when the UAV is in the first orientation or the second orientation.

4. The method of claim 1, wherein a height of the one or more protective covers is greater than a height of the one or more propulsion units.

5. The method of claim 1, wherein a first portion of the one or more protective covers is in contact with an underlying surface when the UAV is in the first orientation, and a second portion of the one or more protective covers is in contact with the underlying surface when the UAV is in the second orientation.

6. The method of claim 5, wherein the first and second portions of the one or more protective covers are laterally opposite to each other relative to a horizontal plane passing through a body of the UAV.

7. The method of claim 6, wherein the second portion is located above the body in a direction of lift generated by the one or more propulsion units when the UAV is in the first orientation.

8. The method of claim 6, wherein the first portion is located above the body in a direction of lift generated by the one or more propulsion units when the UAV is in the second orientation.

9. The method of claim 1, wherein each of the one or more protective covers forms a tunnel around a corresponding propulsion unit of the one or more propulsion units.

10. An unmanned aerial vehicle (UAV), comprising:
one or more propulsion units configured to generate lift for the UAV, the one or more propulsion units comprising a first set of rotating components and a second set of rotating components, wherein the first set of rotating components are configured to rotate in a first direction and the second set of rotating components are configured to rotate in a second direction when the UAV is in a first orientation and the first set of rotating components are configured to rotate in the second direction and the second set of rotating components are configured to rotate in the first direction when the UAV is in a second orientation opposite the first orientation;
one or more one or more processors, wherein one or more processors are configured to individually or collectively control directions of rotation of the first set of rotating components and the second set of rotating components of the one or more propulsion units and effect a flip of the UAV between the first orientation and the second orientation in response to determining that the flip is needed based on a current orientation of the UAV and a landing surface; and
one or more protective covers that prevent the one or more propulsion units from directly contacting an external object.

11. The UAV of claim 10, wherein the one or more protective covers permits the one or more rotating components of the one or more propulsion units to rotate in the first direction or the second direction when the UAV is on an underlying surface.

12. The UAV of claim 10, wherein the one or more processors are located in one or more ESC units or a flight controller.

13. The UAV of claim 10, wherein a signal from the one or more processors is configured to cause the UAV to change orientations between the first orientation and the second orientation.

14. The UAV of claim 10, wherein the one or more rotating components include rotor blades.

15. The UAV of claim 10, wherein the first orientation is for the UAV to be upside down.

16. The UAV of claim 10, wherein the second orientation is for the UAV to be right-side up.

17. The UAV of claim 10, wherein the UAV is capable of taking off from an underlying surface in the first orientation and in the second orientation.

18. The UAV of claim 10, wherein the UAV is capable of hovering or flight when in the first orientation and in the second orientation.

19. The UAV of claim 10, wherein the one or more protective covers serve as landing gears for the UAV.

20. An aerial vehicle, comprising:
one or more propulsion units configured to generate lift for the aerial vehicle, the one or more propulsion units comprising a first set of rotating components and a second set of rotating components, wherein the first set of rotating components are configured to rotate in a first direction and the second set of rotating components are configured to rotate in a second direction when the aerial vehicle is in a first orientation and the first set of rotating components are configured to rotate in the second direction and the second set of rotating components are configured to rotate in the first direction when the aerial vehicle is in a second orientation opposite the first orientation;
one or more one or more processors, wherein one or more processors are configured to individually or collectively control directions of rotation of the first set of rotating components and the second set of rotating components of the one or more propulsion units and effect a flip of the UAV between the first orientation and the second orientation in response to determining that the flip is needed based on a current orientation of the UAV and a landing surface; and
one or more protective covers that prevent the one or more propulsion units from directly contacting an external object.

* * * * *